US011343079B2

(12) United States Patent
Malhotra et al.

(10) Patent No.: US 11,343,079 B2
(45) Date of Patent: May 24, 2022

(54) SECURE APPLICATION DEPLOYMENT

(71) Applicant: ServiceNow, Inc., Santa Clara, CA (US)

(72) Inventors: Rakesh Malhotra, Hyderabad (IN); Sujit Sharma, Hyderabad (IN); Prashant Parbhane, Santa Clara, CA (US); Anil Kumar Akula, Hyderabad (IN); Saurabh Khetan, Santa Clara, CA (US)

(73) Assignee: ServiceNow, Inc., Santa Clara, CA (US)

( * ) Notice: Subject to any disclaimer, the term of this patent is extended or adjusted under 35 U.S.C. 154(b) by 23 days.

(21) Appl. No.: 16/934,459

(22) Filed: Jul. 21, 2020

(65) Prior Publication Data
US 2022/0029794 A1 Jan. 27, 2022

(51) Int. Cl.
H04L 9/08 (2006.01)
H04L 9/32 (2006.01)

(52) U.S. Cl.
CPC .......... H04L 9/0825 (2013.01); H04L 9/0822 (2013.01); H04L 9/0866 (2013.01); H04L 9/0869 (2013.01); H04L 9/3242 (2013.01)

(58) Field of Classification Search
CPC ... H04L 9/0825; H04L 9/3242; H04L 9/0869; H04L 9/0822; H04L 9/0866
See application file for complete search history.

(56) References Cited

U.S. PATENT DOCUMENTS 4,941,084 A 7/1990 Terada et al.
5,185,860 A 2/1993 Wu (Continued)

FOREIGN PATENT DOCUMENTS

EP 0433979 6/1991
EP 1607824 12/2005

(Continued)

OTHER PUBLICATIONS

Symmetric-key algorithm, Wikipedia, last edited on Jul. 11, 2020, retrieved on Jul. 21, 2020, 4 pages, available at https://en.wikipedia.org/w/index.php?title=Symmetric-key_algorithm&oldid=967148120.

(Continued)

Primary Examiner — Jung W Kim
Assistant Examiner — Sangseok Park
(74) Attorney, Agent, or Firm — McDonnell Boehnen Hulbert & Berghoff LLP

(57) ABSTRACT

A computing system includes persistent storage configured to store a plurality of software applications and a distribution application configured to perform operations. The operations include obtaining a first cryptographic key of a pair of asymmetric cryptographic keys, where a second cryptographic key of the pair is stored by an on-premises computational instance, obtaining a selection of a software application from the plurality of software applications for installation, and obtaining an identifier associated with the on-premises computational instance. The operations additionally include encrypting the software application by way of a symmetric encryption algorithm and using a third cryptographic key, and encrypting the third cryptographic key by way of an asymmetric encryption algorithm and using the first cryptographic key. The operations further include generating an installation file that includes the software application as encrypted, the third cryptographic key as encrypted, and a representation of the identifier.

20 Claims, 16 Drawing Sheets

(56) References Cited

U.S. PATENT DOCUMENTS

| | | |
|---|---|---|
| 5,237,518 A | 8/1993 | Sztipanovits et al. |
| 5,261,097 A | 11/1993 | Saxon |
| 5,265,252 A | 11/1993 | Rawson, III et al. |
| 5,367,685 A | 11/1994 | Gosling |
| 5,390,297 A | 2/1995 | Barber et al. |
| 5,442,791 A | 8/1995 | Wrabetz et al. |
| 5,452,415 A | 9/1995 | Hotka |
| 5,522,042 A | 5/1996 | Fee et al. |
| 5,533,116 A | 7/1996 | Vesterinen |
| 5,655,081 A | 8/1997 | Bonnell et al. |
| 5,659,736 A | 8/1997 | Hasegawa et al. |
| 5,671,412 A | 9/1997 | Christiano |
| 5,696,701 A | 12/1997 | Burgess et al. |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke et al. |
| 5,887,139 A | 3/1999 | Madison, Jr. et al. |
| 5,909,217 A | 6/1999 | Bereiter |
| 5,937,165 A | 8/1999 | Schwaller et al. |
| 5,949,976 A | 9/1999 | Chappelle |
| 5,978,594 A | 11/1999 | Bonnell et al. |
| 6,021,437 A | 2/2000 | Chen et al. |
| 6,041,347 A | 3/2000 | Harsham et al. |
| 6,088,717 A | 7/2000 | Reed et al. |
| 6,101,500 A | 8/2000 | Lau |
| 6,128,016 A | 10/2000 | Coelho et al. |
| 6,131,118 A | 10/2000 | Stupek, Jr. et al. |
| 6,134,581 A | 10/2000 | Ismael et al. |
| 6,138,122 A | 10/2000 | Smith et al. |
| 6,148,335 A | 11/2000 | Haggard et al. |
| 6,166,732 A | 12/2000 | Mitchell et al. |
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson, II et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,621,823 B1 | 9/2003 | Mellquist et al. |
| 6,707,795 B1 | 3/2004 | Noorhosseini et al. |
| 6,742,015 B1 | 5/2004 | Bowman-Amuah |
| 6,763,380 B1 | 7/2004 | Mayton et al. |
| 6,816,898 B1 | 11/2004 | Scarpelli et al. |
| 6,895,586 B1 | 5/2005 | Brasher et al. |
| 6,948,175 B1 | 9/2005 | Fong et al. |
| 6,985,901 B1 | 1/2006 | Sachse et al. |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,197,466 B1 | 3/2007 | Peterson et al. |
| 7,215,360 B2 | 5/2007 | Gupta |
| 7,216,304 B1 | 5/2007 | Gourdol et al. |
| 7,222,147 B1 | 5/2007 | Black et al. |
| 7,281,170 B2 | 10/2007 | Taylor et al. |
| 7,412,502 B2 | 8/2008 | Fearn et al. |
| 7,505,872 B2 | 3/2009 | Keller et al. |
| 7,593,013 B2 | 9/2009 | Agutter et al. |
| 7,596,716 B2 | 9/2009 | Frost et al. |
| 7,617,073 B2 | 11/2009 | Trinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,840,490 B1 | 11/2010 | Sellers et al. |
| 7,877,783 B1 | 1/2011 | Cline et al. |
| 7,890,869 B1 | 2/2011 | Mayer et al. |
| 7,966,398 B2 | 6/2011 | Wiles, Jr. |
| 8,060,396 B1 | 11/2011 | Bessler et al. |
| 8,196,210 B2 | 6/2012 | Sterin |
| 8,321,948 B2 | 11/2012 | Robinson et al. |
| 8,407,669 B2 | 3/2013 | Yee et al. |
| 8,554,750 B2 | 10/2013 | Rangarajan et al. |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 9,053,460 B2 | 6/2015 | Gilbert et al. |
| 9,602,292 B2 | 3/2017 | Ramatchandirane |
| 9,603,019 B1 | 3/2017 | Ramatchandirane et al. |
| 2002/0116340 A1 | 8/2002 | Hellberg et al. |
| 2002/0133584 A1 | 9/2002 | Greuel et al. |
| 2002/0158969 A1 | 10/2002 | Gupta |
| 2003/0118087 A1 | 6/2003 | Goldthwaite et al. |
| 2003/0200293 A1 | 10/2003 | Fearn et al. |
| 2005/0015217 A1 | 1/2005 | Weidl et al. |
| 2005/0091356 A1 | 4/2005 | Izzo |
| 2006/0026453 A1 | 2/2006 | Frost et al. |
| 2006/0095461 A1 | 5/2006 | Raymond |
| 2006/0179058 A1 | 8/2006 | Bram et al. |
| 2006/0293942 A1 | 12/2006 | Chaddha et al. |
| 2007/0033279 A1 | 2/2007 | Battat et al. |
| 2007/0188494 A1 | 8/2007 | Agutter et al. |
| 2007/0288389 A1 | 12/2007 | Vaughan et al. |
| 2008/0133289 A1 | 6/2008 | Armour et al. |
| 2008/0148253 A1 | 6/2008 | Badwe et al. |
| 2008/0319779 A1 | 12/2008 | Hughes et al. |
| 2009/0088875 A1 | 4/2009 | Baier et al. |
| 2009/0228984 A1 | 9/2009 | Sterin |
| 2010/0110932 A1 | 5/2010 | Doran et al. |
| 2013/0073725 A1* | 3/2013 | Bordeleau ............... H04L 67/34 709/224 |
| 2013/0318357 A1* | 11/2013 | Abraham .................. H04L 9/32 713/168 |
| 2015/0121536 A1* | 4/2015 | Xing ....................... G06F 21/53 726/26 |
| 2015/0278810 A1 | 10/2015 | Ramatchandirane et al. |
| 2015/0288514 A1* | 10/2015 | Pahl ....................... H04L 63/166 713/171 |
| 2016/0381006 A1* | 12/2016 | Rykowski ............... H04L 63/06 713/156 |
| 2017/0030264 A1 | 2/2017 | Chen et al. |
| 2017/0085537 A1 | 3/2017 | Benedek |
| 2017/0090825 A1* | 3/2017 | Osadchyy ............. G06F 3/1286 |
| 2018/0069841 A1 | 3/2018 | Benedek |
| 2018/0276674 A1 | 9/2018 | Ramatchandirane et al. |
| 2018/0307625 A1* | 10/2018 | Lee ..................... G06F 12/1441 |
| 2019/0036681 A1* | 1/2019 | Sundaresan ............... H04L 9/30 |
| 2021/0058242 A1* | 2/2021 | Donsomsakunkij .. G06F 21/602 |
| 2021/0167953 A1* | 6/2021 | Islam .................... H04L 9/3242 |

FOREIGN PATENT DOCUMENTS

| | | |
|---|---|---|
| WO | WO 99/34285 | 7/1999 |
| WO | WO 00/52559 | 9/2000 |
| WO | WO 01/79970 | 10/2001 |

OTHER PUBLICATIONS

Public-key cryptography, Wikipedia, last edited on Jul. 3, 2020, retrieved on Jul. 21, 2020, 9 pages, available at https://en.wikipedia.org/w/index.php?title=Public-key_cryptography&oldid=965757773.

Message authentication code, Wikipedia, last edited on Jul. 13, 2020, retrieved on Jul. 21, 2020, 6 pages, available at https://en.

(56) References Cited

OTHER PUBLICATIONS wikipedia.org/w/index.php?title=Message_authentication_code&oldid=967500978.

* cited by examiner

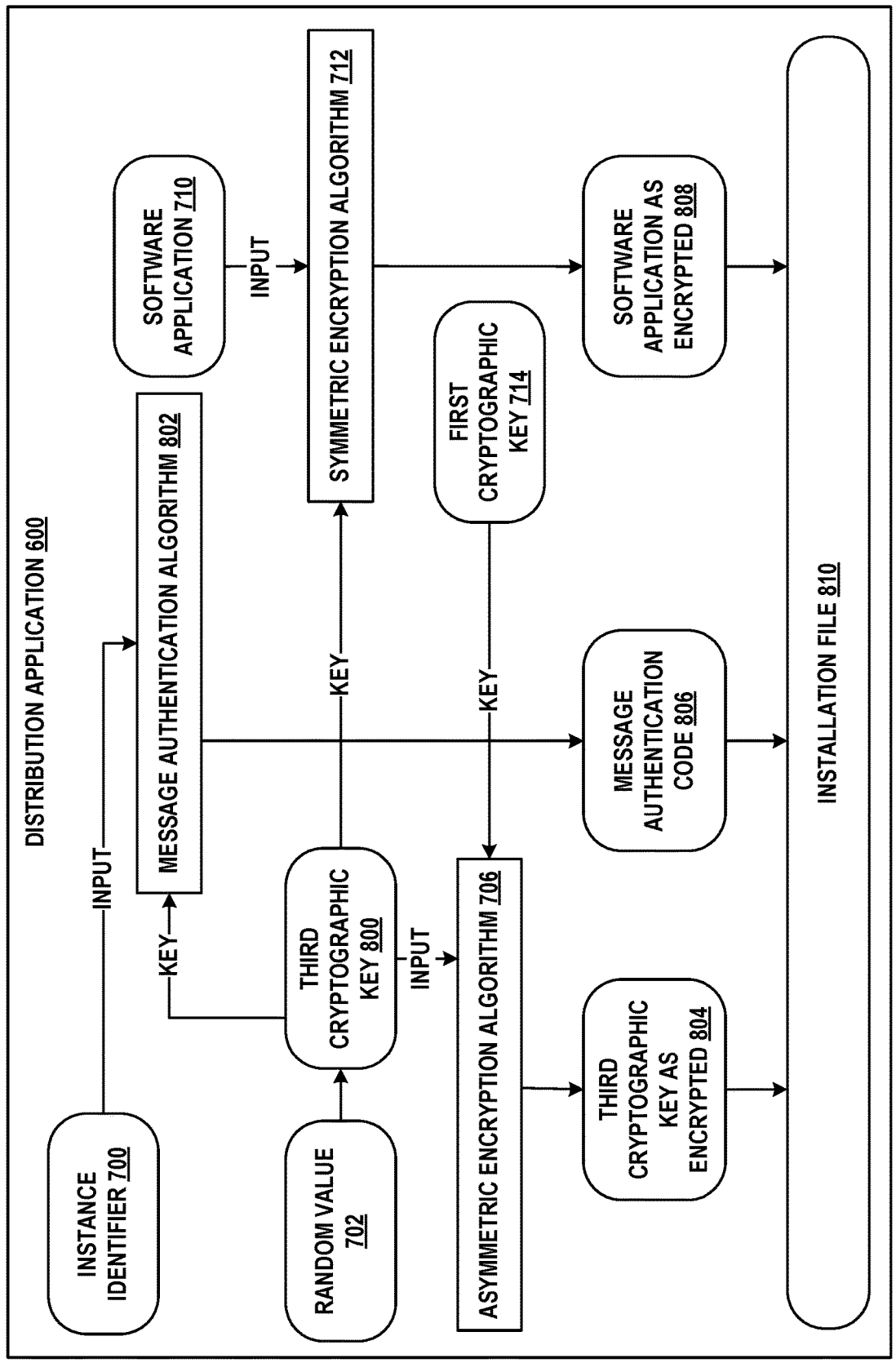

SECURE APPLICATION DEPLOYMENT

BACKGROUND

The process of distributing a software application for installation on different computing systems presents several problems. First, the software application may be modified in undesirable ways during the course of distribution, resulting in the software application as installed operating in undesirable ways. For example, the software application may be modified to include malicious instructions. Second, the code and/or instructions that make up the software application may be shared in undesirable ways, resulting in the software application being installed and used on unintended computing systems. Thus, it can be important to provide a software distribution process that includes security measures which allow for secure sharing of software applications.

SUMMARY

A remote network management platform may provide one or more computational instances to a managed network. In some cases, some the computational instances may be hosted by the remote network management platform and may thus be connected to and have access to a plurality of computing resources provided by the remote network management platform. For example, the computational instances hosted by the remote network management platform may have access to a store application. The store application may provide a plurality of software applications available for installation on and execution by the computational instances. The plurality of software applications may be developed and/or provided by the remote network management platform, a plurality of managed networks managed by the remote network management platform, and/or other application developers. The plurality of software applications may be stored on persistent storage accessible to the store application.

In other cases, some of the computational instances may be self-hosted by the managed network, and may thus be referred to as on-premises computational instances. For example, the on-premises computational instances may be hosted by a public or private cloud-based network that may or might not be supplied by the managed network. Therefore, the term "on-premises" should be construed broadly enough to cover these scenarios as well as other scenarios where software applications are distributed to computational instances not disposed within the remote network management platform. The on-premises computational instances might not be connected to the remote network management platform, and thus might not have access to the plurality of computing resources provided by the remote network management platform. Accordingly, the on-premises computational instances might not have access to the store application.

In order to install a software application made available via the store application on an on-premises computational instance, an installation file of the software application may, for example, be copied to a storage device and physically transported from the remote network management platform to the managed network where the on-premises instance is installed. However, such storage, transportation, and installation of the software application may be vulnerable to undesired modifications and/or distribution of the software application. For example, the software application may be modified prior to installation, resulting in the software application operating in malicious or otherwise undesirable ways. In another example, the software code and/or instructions of the software application may be shared with unintended computing systems, resulting in an unauthorized distribution of the software application.

Accordingly, provided herein is a process for securely sharing a software application between a remote network management platform and an on-premises computational instance disposed within and/or associated with a managed network. The process may be carried out at least in part by a distribution application. In some cases, the distribution application may form part of and/or cooperate with the store application.

Specifically, the managed network may generate a pair of asymmetric cryptographic keys, including a first cryptographic key and a second cryptographic key. The first cryptographic key and the second cryptographic key may be mathematically related so that, under practical assumptions, a message encrypted using the first cryptographic key can only be decrypted using the second cryptographic key, and possibly vice versa.

The first cryptographic key may be provided to the distribution application of the remote network management platform, and may thus be considered a public cryptographic key. The second cryptographic key may be provided to and stored by the on-premises computational instance, and may thus be considered a private cryptographic key. These keys may be used as part of a first encryption layer of the software application. In some implementations, the pair of asymmetric cryptographic keys may be associated with a public key certificate that identifies the pair of asymmetric cryptographic keys (without disclosing the actual content of the second cryptographic key) and links them to the managed network.

The store application and/or the distribution application may be used by the managed network (e.g., by a user associated with the managed network) to select, from the plurality of software applications made available via the store application, a software application for installation on the on-premises computational instance. The distribution application may also be used by the managed network to specify an identifier of the on-premises instance on which the software application is to be installed. The distribution application may be configured to generate a third cryptographic key to be used as part of a second encryption layer of the software application. Within examples, the third cryptographic key may include a combination of (i) a predefined value, (ii) a randomly-generated value, and/or (iii) the identifier of the on-premises instance.

The distribution application may be configured to use the third cryptographic key to encrypt the software application by way of a symmetric encryption algorithm (the second encryption layer). The distribution application may also be configured to use the first cryptographic key to encrypt the third cryptographic key by way of an asymmetric encryption algorithm (the first encryption layer). The distribution application may further be configured to generate an installation file that includes the software application as encrypted, the third cryptographic key as encrypted, and a representation of the identifier.

The installation file may be provided to the on-premises computational instance to allow for secure installation of the software application. The on-premises computational instance may be configured to use the second cryptographic key to decrypt the third cryptographic key as encrypted in the installation file. The on-premises software application may then use the third cryptographic key to decrypt the software application as encrypted. Thus, in order to decrypt the third cryptographic key and, in turn, the software application, the computational instance needs to have access to the second cryptographic key. Accordingly, while the second cryptographic key is kept secure, a third-party may be unable to decrypt and install the software application.

Further, the on-premises computational instance may be configured to determine whether the representation of the identifier stored in the installation file corresponds to the identifier associated with and stored by the on-premises computational instance. Thus, a particular on-premises computational instance attempting installation of the software application may verify that the installation file was generated to be used with the particular on-premises computational instance, rather than with another on-premises computational instance. If the on-premises computational instance determines that it is the intended recipient of the installation file, it may install the software application. Otherwise, if the on-premises computational instance determines that it is not the intended recipient of the installation file, it may reject the software application. Thus, the identifier should be kept secure between the remote network management platform and the on-premises computational instance (or at least the managed network).

Within examples, the identifier may be represented in the installation file in a plurality of ways. In some implementations, the identifier may be represented by a message authentication code (MAC) generated by a hash function. The MAC may be based on a combination of the identifier, a predefined value that defines as least part of the third cryptographic key, and/or a randomly-generated value that defines as least part of the third cryptographic key. For example, the identifier may be a key used by the hash function, while the predefined value and/or the randomly-generated value may be an input to the hash function, or vice versa. In another example, the identifier, the predefined value, and/or the randomly-generated value may be inputs to the hash function, while the key may be a fourth cryptographic key shared by the remote network management platform and the on-premises computational instance. The identifier itself might not be explicitly included in the installation file, but may be represented by the MAC. Thus, the on-premises computational instance may independently generate its own second MAC based on the identifier stored thereby, and may determine that the installation file was intended therefor based on the MAC in the installation file matching the second MAC independently generated by the on-premises computational instance.

In other implementations, the identifier may form part of the third-cryptographic key. For example, the third cryptographic key may be a concatenation of the identifier and a randomly-generated value. Thus, the identifier may be represented in the installation file as part of the third cryptographic key. In some cases, the entirety of the third cryptographic key may be encrypted by way of the asymmetric encryption algorithm. In other cases, part of the third cryptographic key may be encrypted, while another part may be omitted from encryption and inclusion in the installation file.

For example, when the third cryptographic key is a concatenation of the identifier and the randomly-generated value, the randomly-generated value may be encrypted, but the identifier might not be encrypted and might not be stored in the installation file. Thus, upon reception of the installation file, the on-premises computational instance may decrypt the partial third cryptographic key (i.e., the randomly-generated value) as encrypted, concatenate therewith the identifier stored by the on-premises computational instance in order to generate the complete third cryptographic key, and attempt to decrypt the software application as encrypted using the complete third cryptographic key. Any mismatch between the identifier used by the distribution application in encrypting the software application and the identifier stored by the on-premises computational instance may result in unsuccessful decryption, thus indicating whether the installation file is being used by the on-premises computational instance for which it was intended.

Accordingly, a first example embodiment may involve obtaining, by a distribution application, a first cryptographic key of a pair of asymmetric cryptographic keys. A second cryptographic key of the pair of asymmetric cryptographic keys may be stored by an on-premises computational instance. The first example embodiment may also involve obtaining, by the distribution application, a selection of a software application for installation on the on-premises computational instance. The software application may be selected from a plurality of software applications installable on computational instances and stored by persistent storage. The first example embodiment may additionally involve obtaining, by the distribution application, an identifier associated with the on-premises computational instance. The first example embodiment may further involve encrypting, by the distribution application, the software application by way of a symmetric encryption algorithm and using a third cryptographic key and encrypting, by the distribution application, the third cryptographic key by way of an asymmetric encryption algorithm and using the first cryptographic key. The first example embodiment may further involve generating, by the distribution application, an installation file that includes the software application as encrypted, the third cryptographic key as encrypted, and a representation of the identifier. The on-premises computational instance may be configured to: (i) confirm that the representation of the identifier contained in the installation file corresponds to the identifier associated with the on-premises computational instance, and (ii) install the software application using the installation file.

In a second example embodiment, a computing system may include persistent storage configured to store a plurality of software applications installable on computational instances and a distribution application configured to perform operations. The operations may include obtaining a first cryptographic key of a pair of asymmetric cryptographic keys. A second cryptographic key of the pair of asymmetric cryptographic keys may be stored by an on-premises computational instance. The operations may also include obtaining a selection of a software application from the plurality of software applications for installation on the on-premises computational instance. The operations may additionally include obtaining an identifier associated with the on-premises computational instance. The operations may further include encrypting the software application by way of a symmetric encryption algorithm and using a third cryptographic key, and encrypting the third cryptographic key by way of an asymmetric encryption algorithm and using the first cryptographic key. The operations may yet further include generating an installation file that includes the software application as encrypted, the third cryptographic key as encrypted, and a representation of the identifier. The on-premises computational instance may be configured to: (i) confirm that the representation of the identifier contained in the installation file corresponds to the identifier associated with the on-premises computational instance, and (ii) install the software application using the installation file.

In a third example embodiment, an article of manufacture may include a non-transitory computer-readable medium, having stored thereon program instructions that, upon execution by a computing system, cause the computing system to perform operations in accordance with the first example embodiment and/or the second example embodiment.

In a fourth example embodiment, a computing system may include at least one processor, as well as memory and program instructions. The program instructions may be stored in the memory, and upon execution by the at least one processor, cause the computing system to perform operations in accordance with the first example embodiment and/or the second example embodiment.

In a fifth example embodiment, a system may include various means for carrying out each of the operations of the first example embodiment and/or the second example embodiment.

A sixth example embodiment may involve obtaining, by an on-premises computational instance, a second cryptographic key of a pair of asymmetric cryptographic keys. A first cryptographic key of the pair of asymmetric cryptographic keys may be stored by a distribution application. The sixth example embodiment may also involve obtaining, by the on-premises computational instance, an installation file generated by the distribution application. The installation file may include a software application as encrypted, a third cryptographic key as encrypted, and a representation of an identifier associated with the on-premises computational instance. The sixth example embodiment may additionally involve decrypting, by the on-premises computational instance, the third cryptographic key as encrypted by way of an asymmetric encryption algorithm and using the second cryptographic key. The third cryptographic key may have been encrypted by the distribution application by way of the asymmetric encryption algorithm and using the first cryptographic key. The sixth example embodiment may yet additionally involve decrypting, by the on-premises computational instance, the software application as encrypted by way of a symmetric encryption algorithm and using the third cryptographic key. The software application may have been encrypted by the distribution application by way of the symmetric encryption algorithm and using the third cryptographic key. The sixth example embodiment may further involve confirming, by the on-premises computational instance, that the representation of the identifier contained in the installation file corresponds to the identifier associated with the on-premises computational instance. The sixth example embodiment may yet further involve installing, by the on-premises computational instance, the software application based on confirming that the representation of the identifier corresponds to the identifier associated with the on-premises computational instance.

In a seventh example embodiment, an article of manufacture may include a non-transitory computer-readable medium, having stored thereon program instructions that, upon execution by a computing system, cause the computing system to perform operations in accordance with the sixth example embodiment.

In an eighth example embodiment, a computing system may include at least one processor, as well as memory and program instructions. The program instructions may be stored in the memory, and upon execution by the at least one processor, cause the computing system to perform operations in accordance with the sixth example embodiment.

In a ninth example embodiment, a system may include various means for carrying out each of the operations of the sixth example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIGS. 8A and 8B illustrate an encryption architecture, in accordance with example embodiments.

DETAILED DESCRIPTION

Figure 1:
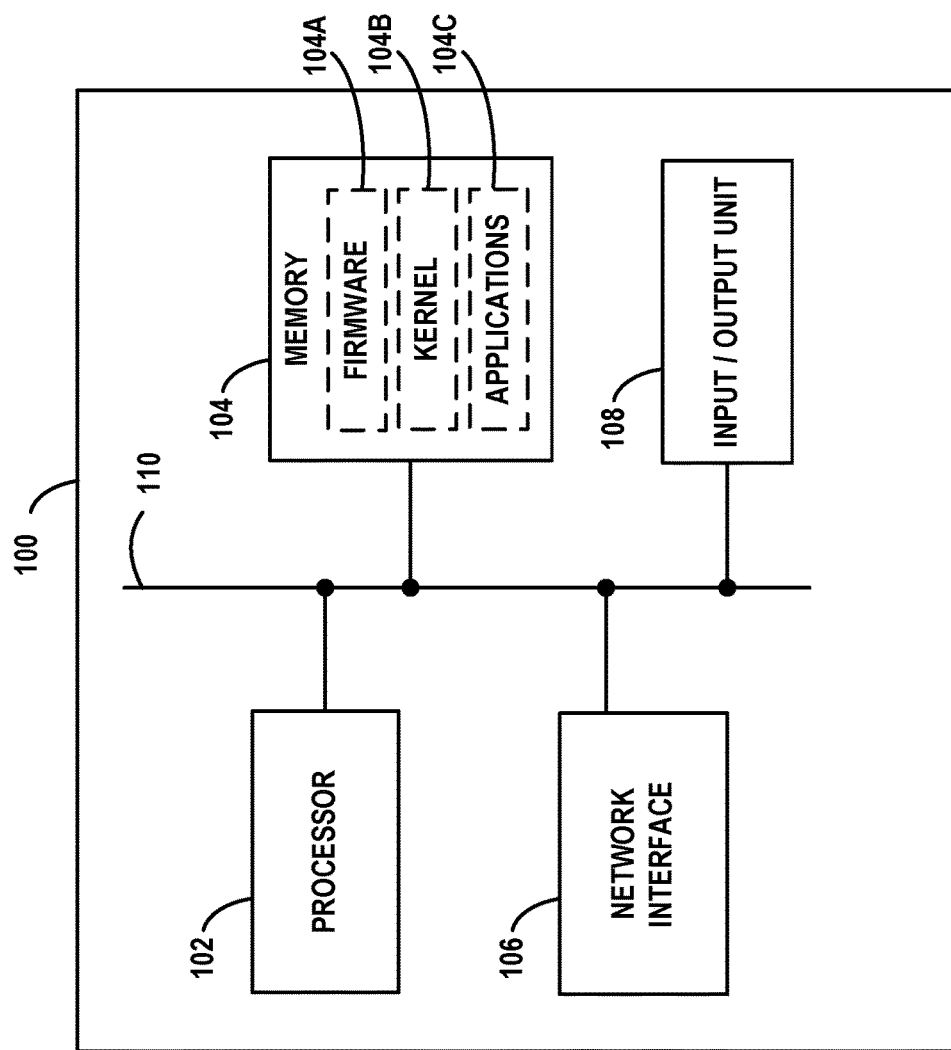
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
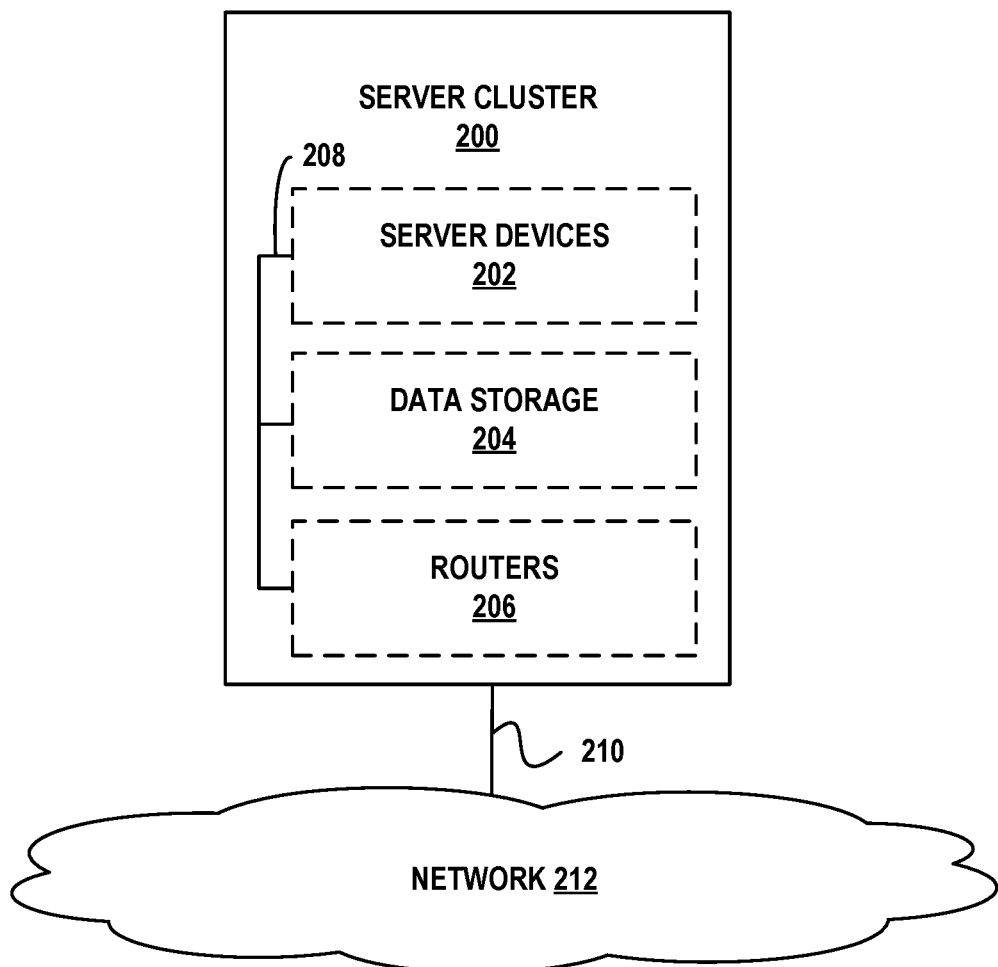
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
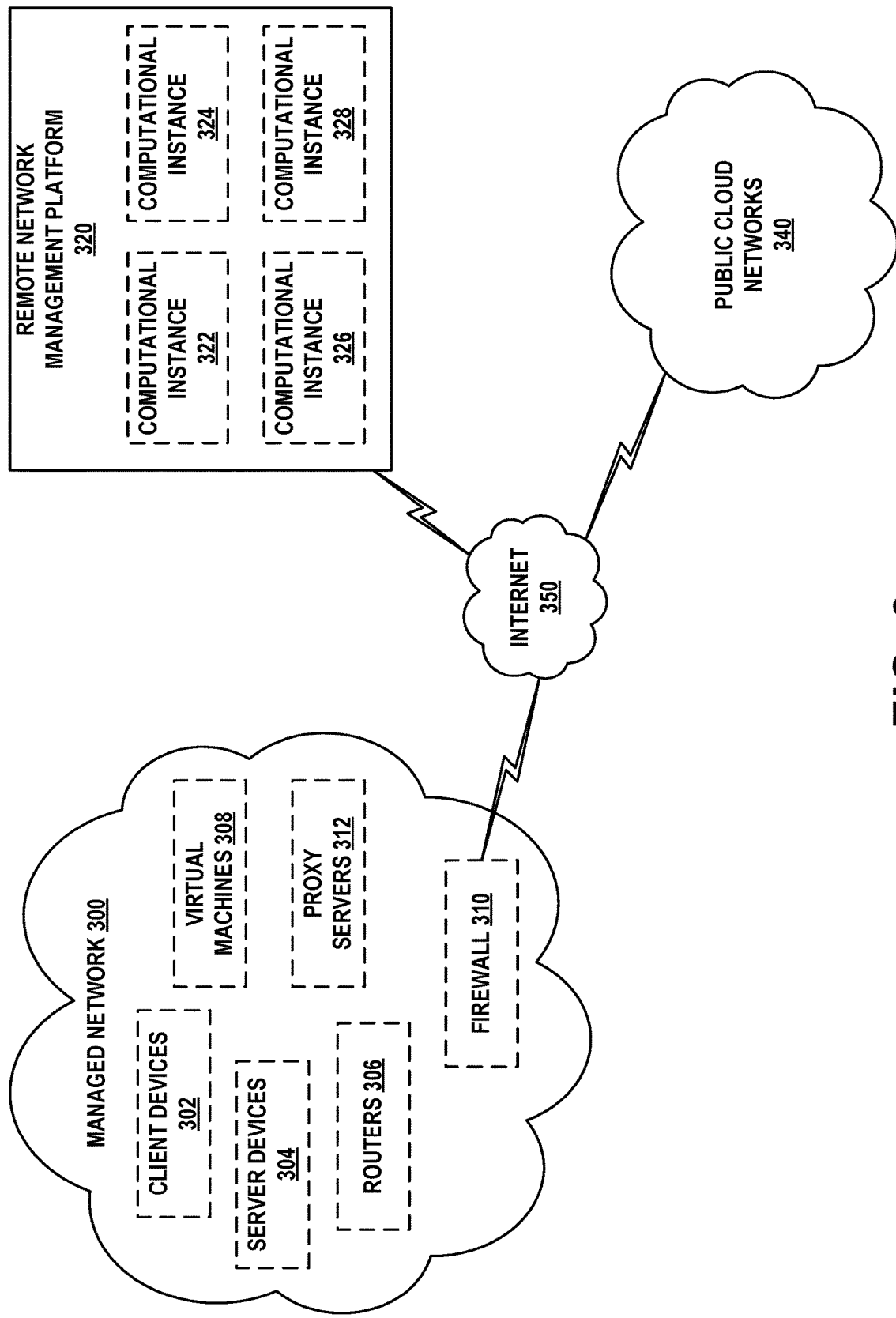
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
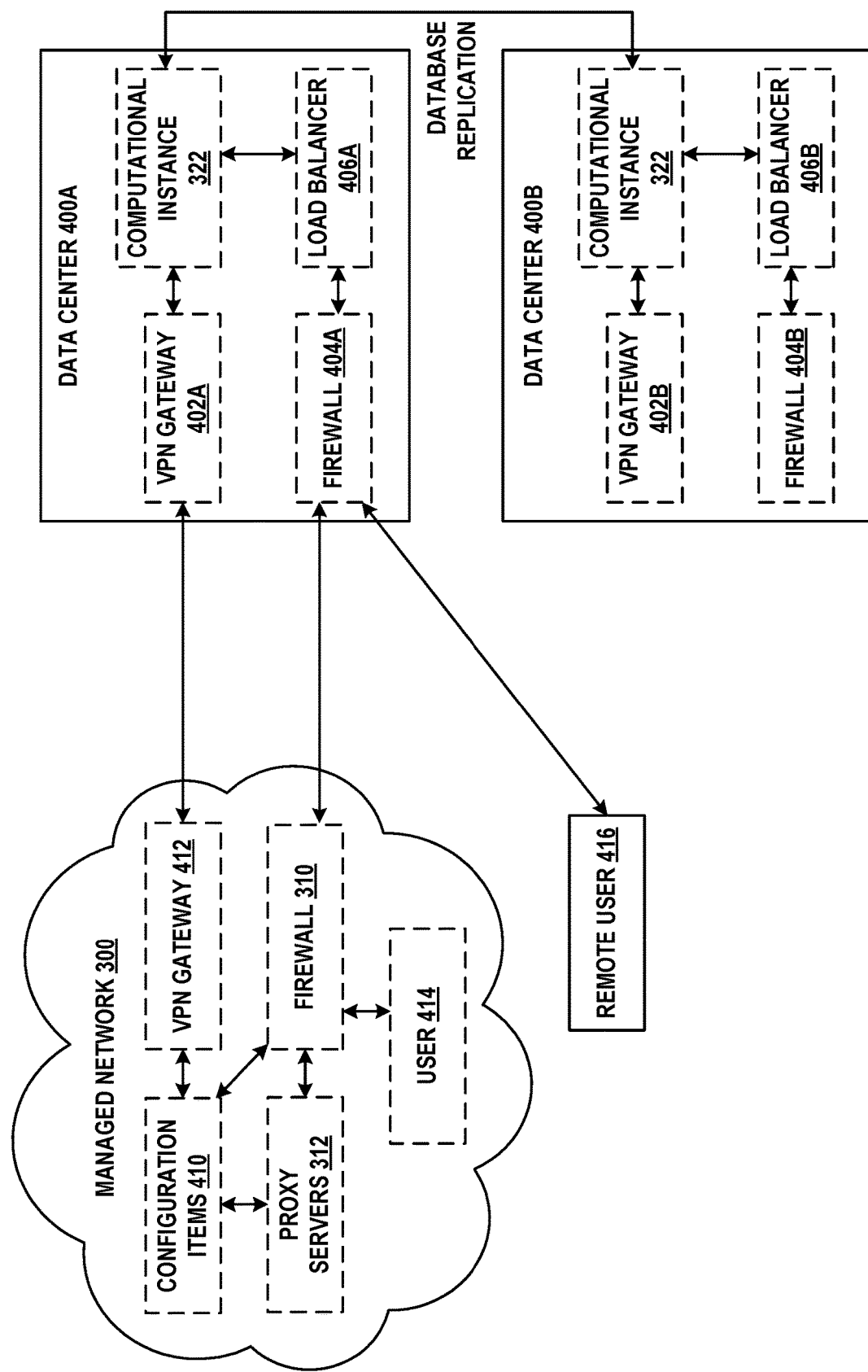
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
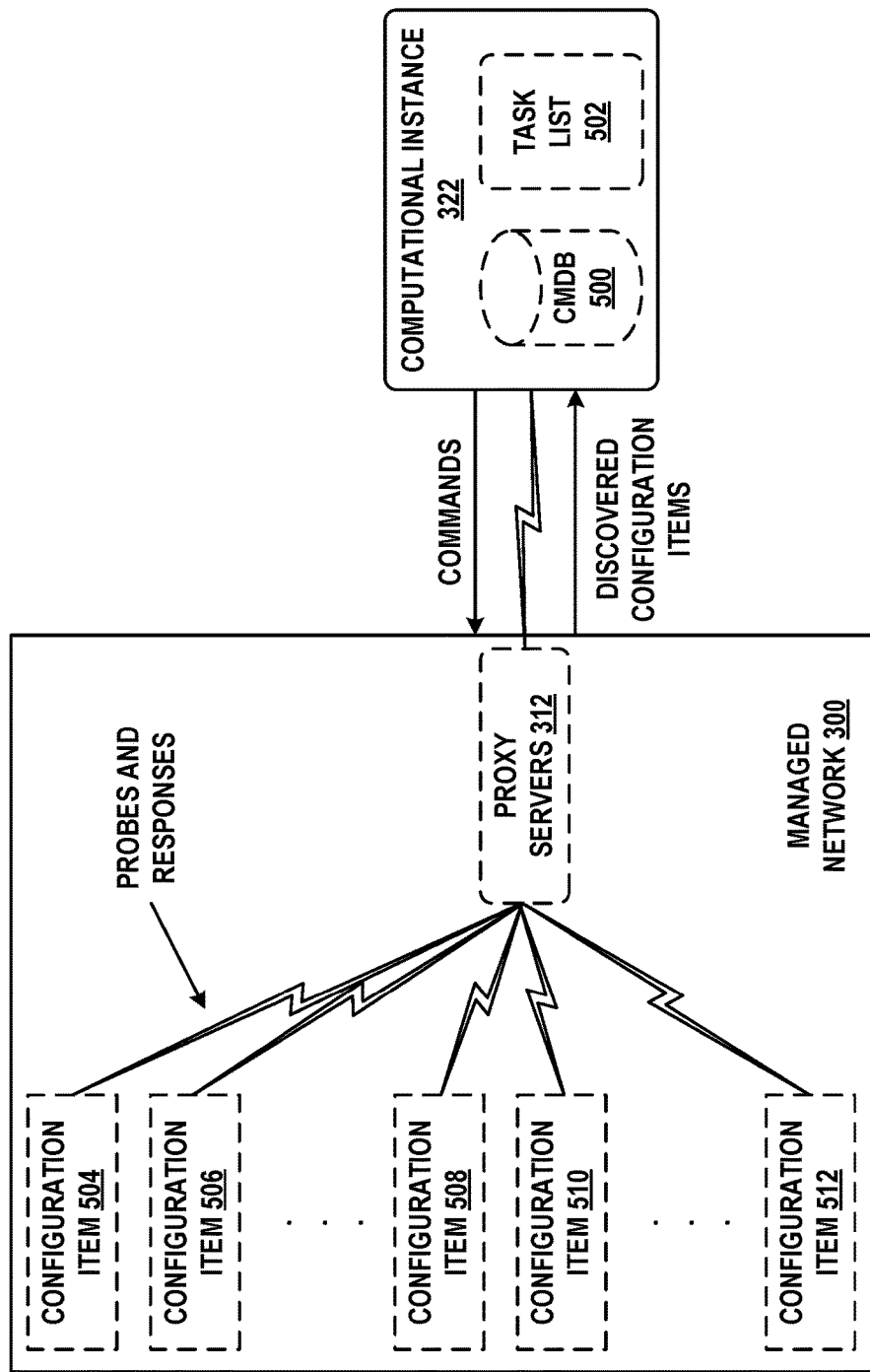
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
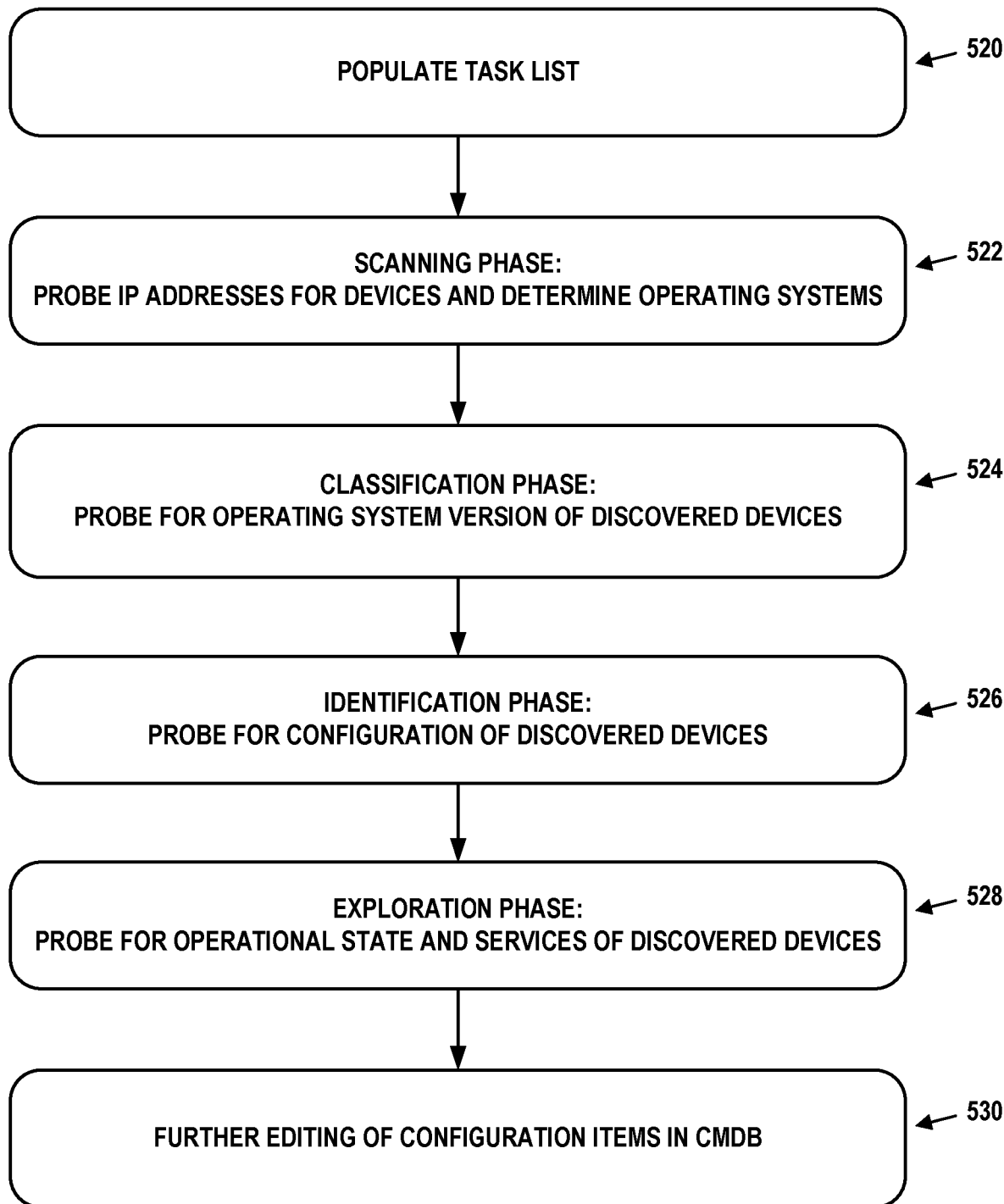
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. Example Encryption of a Software Application

Remote network management platform 320 may provide, by way of a store application, a plurality of software applications for installation on and execution by the computational instances hosted by remote network management platform 320 on behalf of managed network 300. Since these computational instances and the store application are each hosted by remote network management platform 320, the computational instances may communicatively connect to the store application to carry out the installation of selected software applications. In some cases, however, managed network 300 may include one or more on-premises computational instances that, instead of being hosted by remote network management platform 320, are hosted by managed network 300. For example, the on-premises computational instances may be hosted on infrastructure provided by managed network 300 directly and/or on infrastructure provided by a third-party system on behalf of managed network 300. Because some of these on-premises computational instances might not be configured to communicatively connect to the store application of remote network management platform 320, a secure process may be needed for distributing the software applications from the store application to the on-premises computational instances.

Figure 6A:
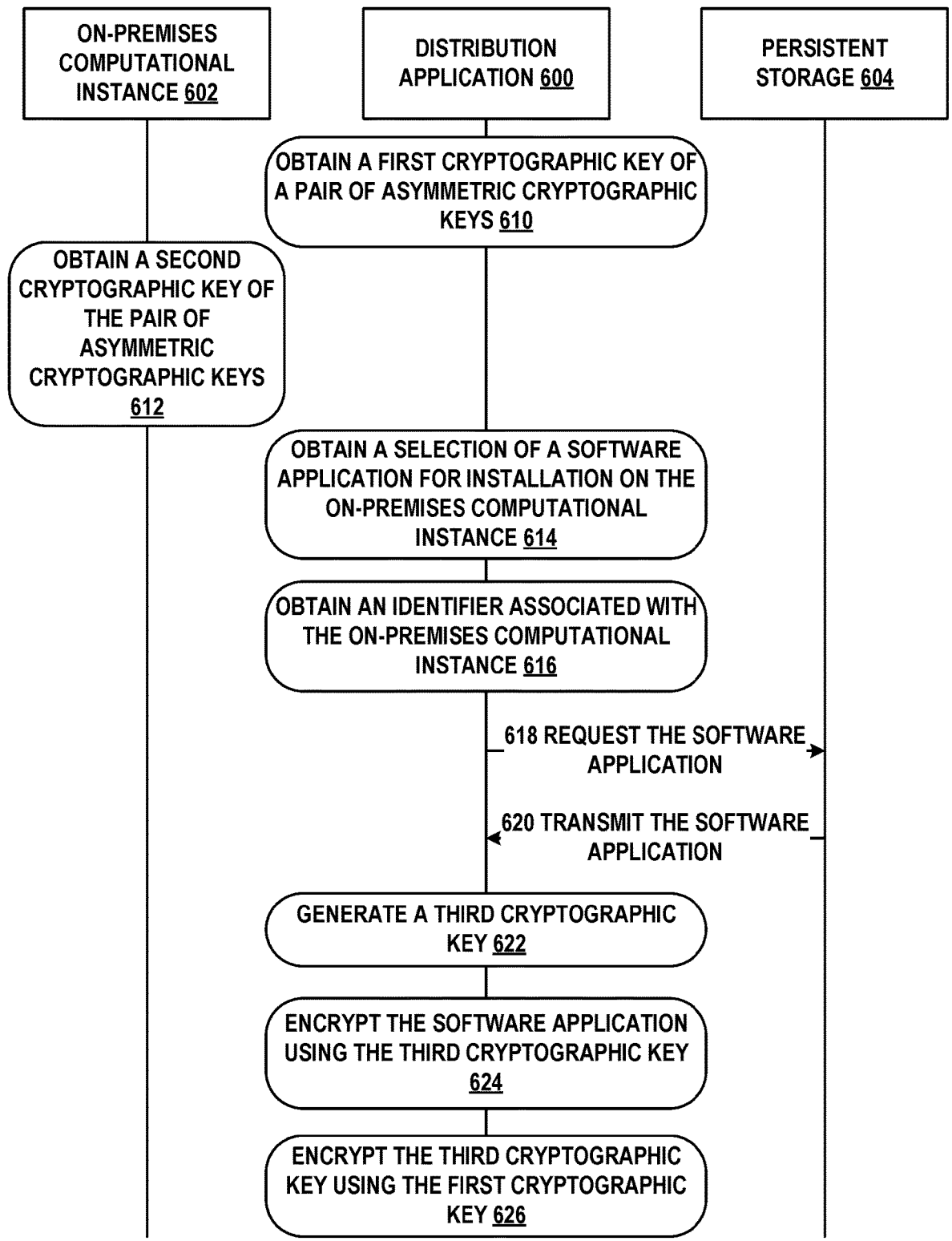
FIGS. 6A and 6B illustrate message flow diagrams, in accordance with example embodiments.
Figure 6B:
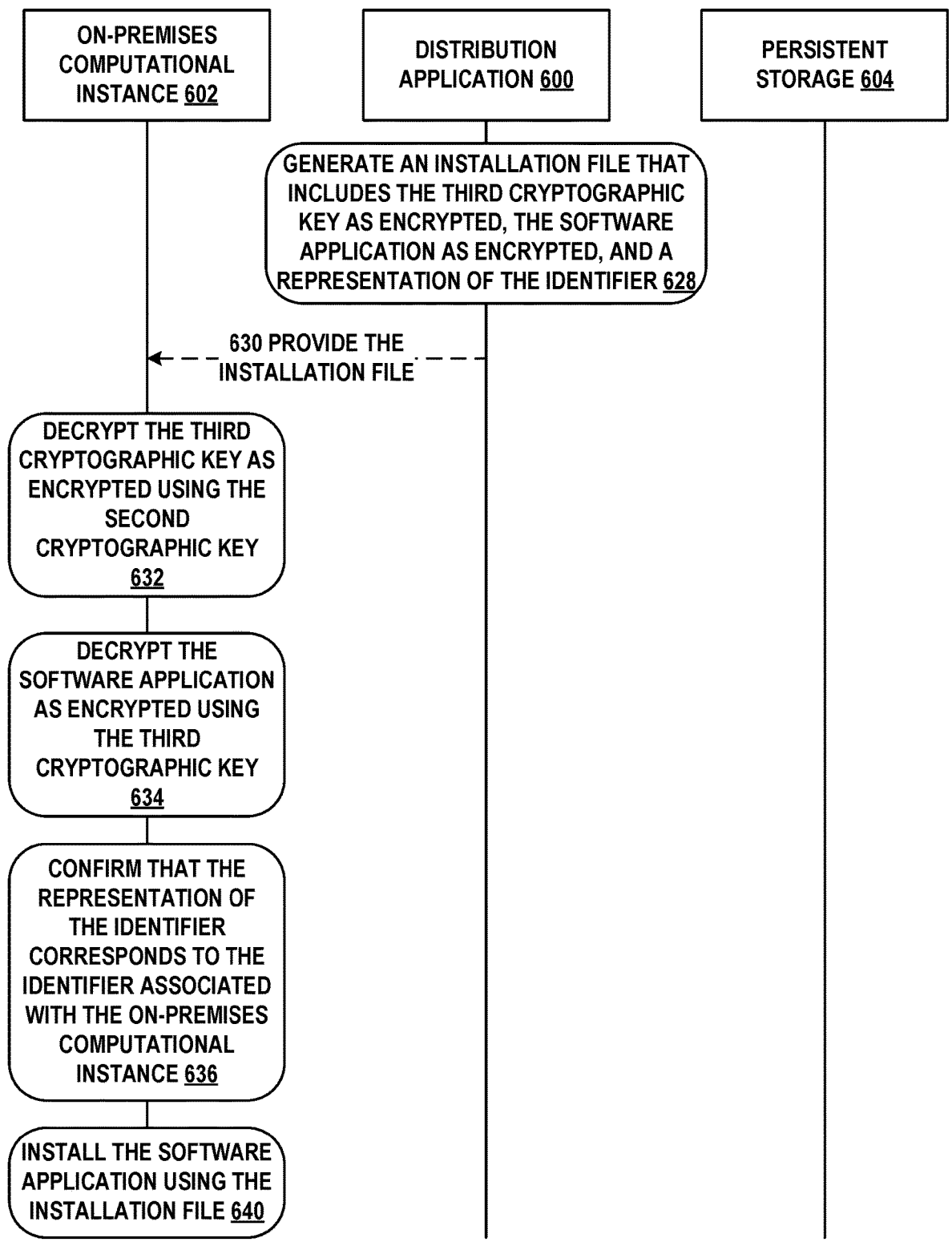

Accordingly, FIGS. 6A and 6B illustrate a message flow diagram representing operations involved in generating an installation file that allows a software application, or an update to the software application, to be securely transferred to and installed on an on-premises computational instance. Specifically, FIGS. 6A and 6B illustrate distribution application 600, on-premises computational instance 602, and persistent storage 604.

Distribution application 600 and persistent storage 604 may each be disposed within remote network management platform 320. Persistent storage 604 may store thereon a plurality of software applications available for installation on computational instances. Distribution application 600 may form part of the store application and may be configured to facilitate installation of the software applications stored by persistent storage 604 on on-premises computational instances, such as on-premises computational instance 602. On-premises computational instance 602 may be hosted on infrastructure provided outside of remote network management platform 320 by and/or on behalf of managed network 300. Thus, on-premises computational instance 602 might not be configured to directly communicate with the store application and/or distribution application 600 (e.g., by way of a secure communicative connection), and therefore might not be able to directly request and receive the software applications stored in persistent storage 604.

Thus, in order to allow for secure transfer of the software applications, distribution application 600 may be configured to obtain a first cryptographic key of a pair of asymmetric cryptographic keys, as indicated by block 610. Additionally, on-premises computational instance 602 may be configured to obtain a second cryptographic key of the pair of asymmetric cryptographic keys, as indicated by block 612. In some implementations, the operations of block 612 may be carried out before the operations of block 610. In one example, a user associated with managed network may generate the pair of asymmetric cryptographic keys and provide the first cryptographic key to distribution application 600 by way of a first user interface provided thereby, and provide the second cryptographic key to on-premises computational instance 602 by way of a second user interface provided thereby. In another example, the pair of asymmetric cryptographic keys may be generated by on-premises computational instance 602. Thus, on-premises computational instance may obtain the second cryptographic key by generating it, and may allow the user to download or copy a representation of the first cryptographic key for provisioning into distribution application 600.

The first cryptographic key may be viewed as a public key since it is shared with distribution application 600, and the second cryptographic key may be viewed as a private cryptographic key since it is not intended to be shared outside of managed network 300. The first cryptographic key and the second cryptographic key may be mathematically related so that, under practical assumptions, a message encrypted using the first cryptographic key can only be decrypted using the second cryptographic key, and possibly vice versa. Further, in some implementations, the pair of asymmetric cryptographic keys may be associated with a certificate, which may be referred to as a public key certificate, a digital certificate, and/or an identity certificate, that links the pair of asymmetric cryptographic keys to one another and/or to managed network 300 without disclosing the actual content of the second cryptographic key.

Distribution application 600 may also be configured to obtain a selection of a software application for installation on on-premises computational instance 602, as indicated by block 614. In some cases, the software application may be a software application that is yet to be installed on on-premises computational instance 602. In other cases, the software application may be an update to a software application already installed on on-premises computational instance 602.

Distribution application 600 may further be configured to obtain an identifier associated with on-premises computational instance 602, as indicated by block 616. In some cases, the identifier may be obtained at block 616 based on or in response to obtaining the selection of the software application at block 614. The selection of the software application at block 614 and the obtainment of the identifier at block 616 may be facilitated by one or more user interfaces provided by distribution application and/or the store application.

For example, a user associated with managed network 300 may use a first user interface provided by distribution application 600 and/or the store application to select the software application from the plurality of software applications stored by persistent storage 604. Based on or in response to this selection, distribution application 600 and/or the store application may provide a second user interface prompting the user to specify the identifier of on-premises computational instance 602 for which the selected software application is intended. The user may obtain this identifier by way of one or more additional user interfaces provided by on-premises computational instance 602 and/or managed network 300. Alternatively, the identifier may have been pre-configured in distribution application 600, and the user may select the identifier by way of the first user interface.

Based on or in response to selection of the software application at block 614 and/or obtaining of the identifier at block 616, distribution application 600 may be configured to transmit, to persistent storage 604, a request for the selected software application, as indicated by arrow 618. Based on or in response to reception of the request at arrow 618, persistent storage 604 may be configured to retrieve the selected software application and transmit, to distribution application 600, the selected software application, as indicated by arrow 620.

Based on or in response to obtaining of the identifier at block 616 and/or reception of the selected software application at arrow 620, distribution application 600 may be configured to generate a third cryptographic key, as indicated by block 622. The third cryptographic key may be a combination of one or more of the identifier obtained at block 616, a randomly-generated value, and/or a predetermined value. Example combinations of the third cryptographic key are illustrated in FIGS. 7A, 7B, 8A, 8B, 9A, and 9B.

Based on or in response to generation of the third cryptographic key, distribution application 600 may be configured to encrypt the software application by way of a symmetric encryption algorithm and using the third cryptographic key, as indicated by block 624. The symmetric encryption algorithm may allow a message that is encrypted using the third cryptographic key to also be decrypted using the third cryptographic key.

Encryption of the software application by way of a symmetric encryption algorithm, rather than an asymmetric encryption algorithm, allows both distribution application 600 and on-premises computational instance 602 to use the same key (i.e., the third cryptographic key) for both encryption and decryption. Using the same cryptographic key for both encryption and decryption may allow the key itself to be used to verify whether the application is being installed on the on-premises computational instance for which it was intended, as will be discussed in more detail at least with respect to FIGS. 9A and 9B.

Turning to FIG. 6B, based on or in response to encryption of the software application at block 624, distribution application 600 may be configured to encrypt the third cryptographic key. This encryption may take place by way of an asymmetric encryption algorithm and using the first cryptographic key (obtained at block 610), as indicated by block 626. By using the asymmetric encryption algorithm, the third cryptographic key may be decrypted by using only the second cryptographic key of the pair. Thus, the software application may be protected from unintended installations as long as the second cryptographic key is not shared outside of on-premises computational instance 602 and/or managed network 300.

Based on or in response to encryption of the software application at block 624 and/or encryption of the third cryptographic key at block 626, distribution application 600 may be configured to generate an installation file, as indicated by block 628. The installation file may include the third cryptographic key as encrypted, the software application as encrypted, and a representation of the identifier. Thus, at least part of the third cryptographic key may be provided (in an encrypted format) to on-premises computational instance 602 by way of the installation file.

In some implementations, the identifier may be represented in the installation file by being directly stored therein in encrypted or unencrypted form. For example, the identifier may be stored in the installation file as part of the encrypted third cryptographic key. In other implementations, the identifier may be represented in the installation file indirectly by way of the third cryptographic key and/or the software application. For example, while the identifier might be omitted from the installation file, it may be needed to regenerate the third cryptographic key to decrypt the software application. Thus, the identifier may be represented by the dependency of the third cryptographic key as encrypted and/or the software application as encrypted on the identifier.

In some implementations, distribution application 600 may also be configured to store in the installation file an expiration time. The expiration time may indicate how long the installation file remains valid (e.g., 7 days after generation). On-premises computational instances may be configured to install unexpired files and reject installation of expired files. By defining the time window during which the installation file is valid, the window of opportunity for unintended modifications to the software application may be limited, since on-premises computational instances will avoid installing expired versions of a software application.

Based on or in response to generation of the installation file at block 628, distribution application 600 may be configured to provide the installation file for installation on on-premises computational instance 602, as indicated by arrow 630. Arrow 630 is drawn using a dashed line to indicate that distribution application 600 might not provide the installation file to on-premises computational instance 602 directly. Instead, distribution application 600 may, for example, generate the installation file, which may be stored on a storage device, and the storage device may then be physically transported to a computing device within managed network 300 associated with on-premises computational instance 602, where the software application may be provided for installation. The software application may be encrypted to reduce the probability and/or prevent the possibility of the installation file being modified and/or distributed in undesirable ways during transport of the storage device.

Based on or in response to reception of the installation file at arrow 630, on-premises computation instance 602 may be configured to decrypt the third cryptographic key as encrypted, as indicated by block 632. Specifically, on-premises computational instance 602 may be configured to decrypt the third cryptographic key as encrypted by way of the asymmetric encryption algorithm and using the second cryptographic key. The asymmetric encryption algorithm used by on-premises computational instance 602 may be the same as the asymmetric encryption algorithm used by distribution application 600 at block 626.

In some implementations, the installation file may include a fingerprint (e.g., a message digest) associated with the certificate that links the first cryptographic key and the second cryptographic key. Thus, the second cryptographic key may be selected to be used at block 632 based on the fingerprint in the installation file. Specifically, the fingerprint in the installation file may be compared to a second fingerprint associated with the second cryptographic key. The second cryptographic key may be selected from among a plurality of other cryptographic keys based on the fingerprint in the installation file matching the second fingerprint.

In some cases, the complete third cryptographic key may be encrypted at block 626. Thus, upon decryption at block 632, the third cryptographic key may be ready for use in subsequent steps. In other cases, part of the third cryptographic key may be encrypted at block 626. Thus, upon decryption at block 632, the partial third cryptographic key may be modified to generate the complete third cryptographic key. For example, the partial third cryptographic key, representing a random number generated by distribution application 600 at block 622, may be combined with the identifier of on-premises computational instance 602 to generate the complete third cryptographic key.

Based on or in response to decryption the third cryptographic key at block 632, on-premises computational instance 602 may be configured to decrypt the software application as encrypted, as indicated by block 634. Specifically, on-premises computational instance 602 may be configured to decrypt the software application as encrypted by way the symmetric encryption algorithm and using the complete third cryptographic key. The symmetric encryption algorithm used by on-premises computational instance 602 may be the same as the symmetric encryption algorithm used by distribution application 600 at block 624.

Based on or in response to decryption of the software application at block 634, on-premises computational instance 602 may be configured to confirm that the representation of the identifier in the installation file corresponds to the identifier associated with on-premises computational instance 602, as indicated by block 636. Specifically, the installation file may include a first representation of the identifier, while the on-premises computational instance may store and/or compute its own representation of its own identifier. Thus, on-premises computational instance may be configured to compare the first representation of the identifier to the second representation of the identifier and determine whether the two representations are the same or different.

Based on or in response to confirming that the first representation of the identifier matches the second representation of the identifier at block 636, on-premises computational instance may be configured to install the software application using the installation file, as indicated by block 640. Thus, on-premises computational instance 602 may be configured to install the software application upon verifying that the installation file was intended for on-premises computational instance 602, rather than some other computational instance. If on-premises computational instance 602 is unable to verify that the installation file was intended for on-premises computational instance 602, on-premises computational instance 602 may be configured to reject the software application and/or the installation file.

Thus, on-premises computational instance 602 may trust that the software application originated from distribution application 600 and was not modified in distribution based on successful decryption and matching of the instance identifiers. On-premises computational instance 602 thus might not need to verify that the user assisting with the distribution and/or installation is considered a trusted source.

In some implementations, on-premises computational instance 602 may also be configured to determine whether a current time is before or after the expiration time associated with the installation file. If the current time is before the expiration time, and the installation file is thus deemed valid (i.e., not expired), on-premises computational instance 602 may be configured to install the software application. Otherwise, if the current time has passed the expiration time, and the installation file is thus deemed expired, on-premises computational instance 602 may be configured to reject installation of the software application.

VI. EXAMPLE ENCRYPTION ARCHITECTURES

Figure 7A:
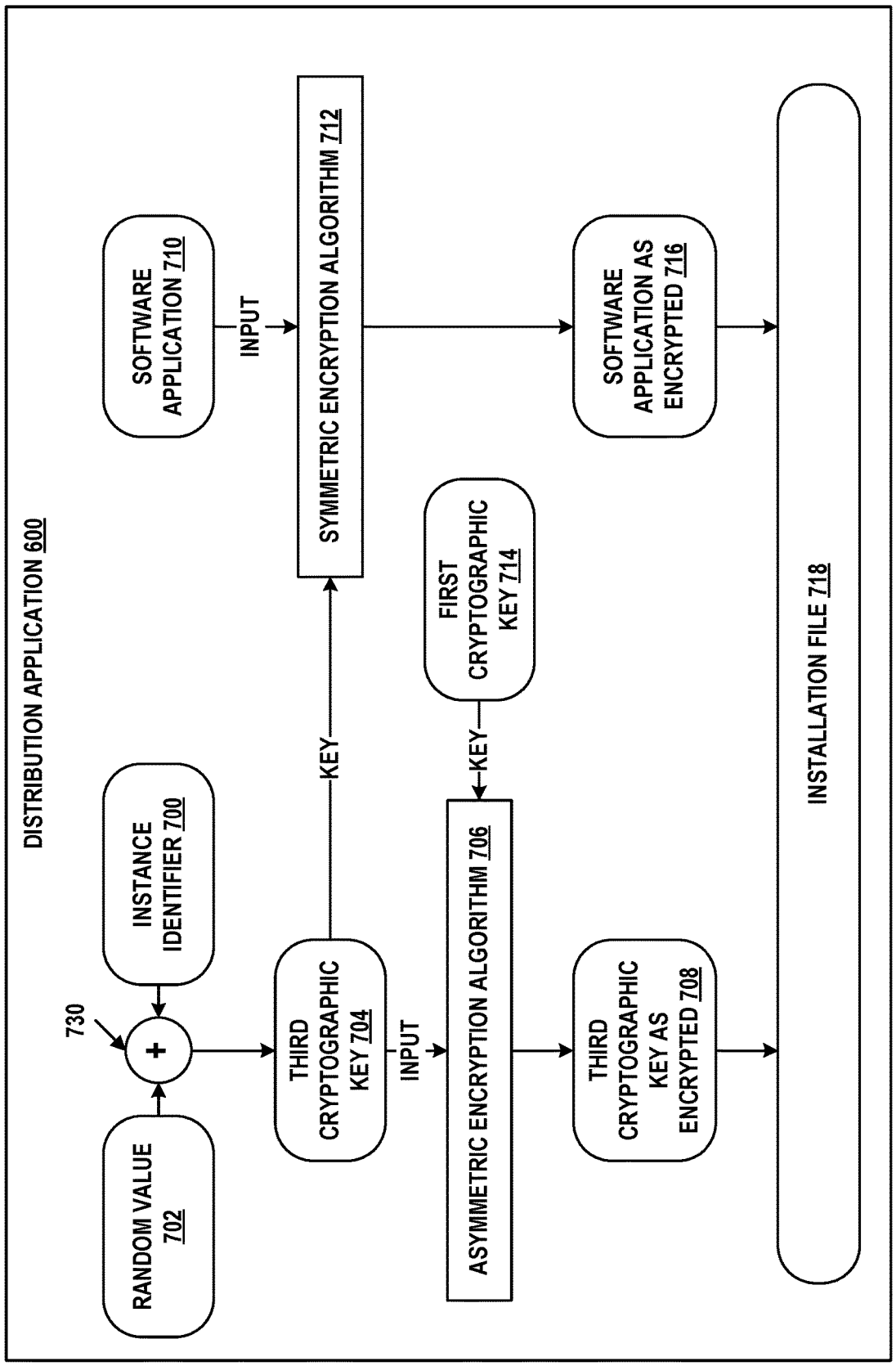
FIGS. 7A and 7B illustrate an encryption architecture, in accordance with example embodiments.
Figure 7B:
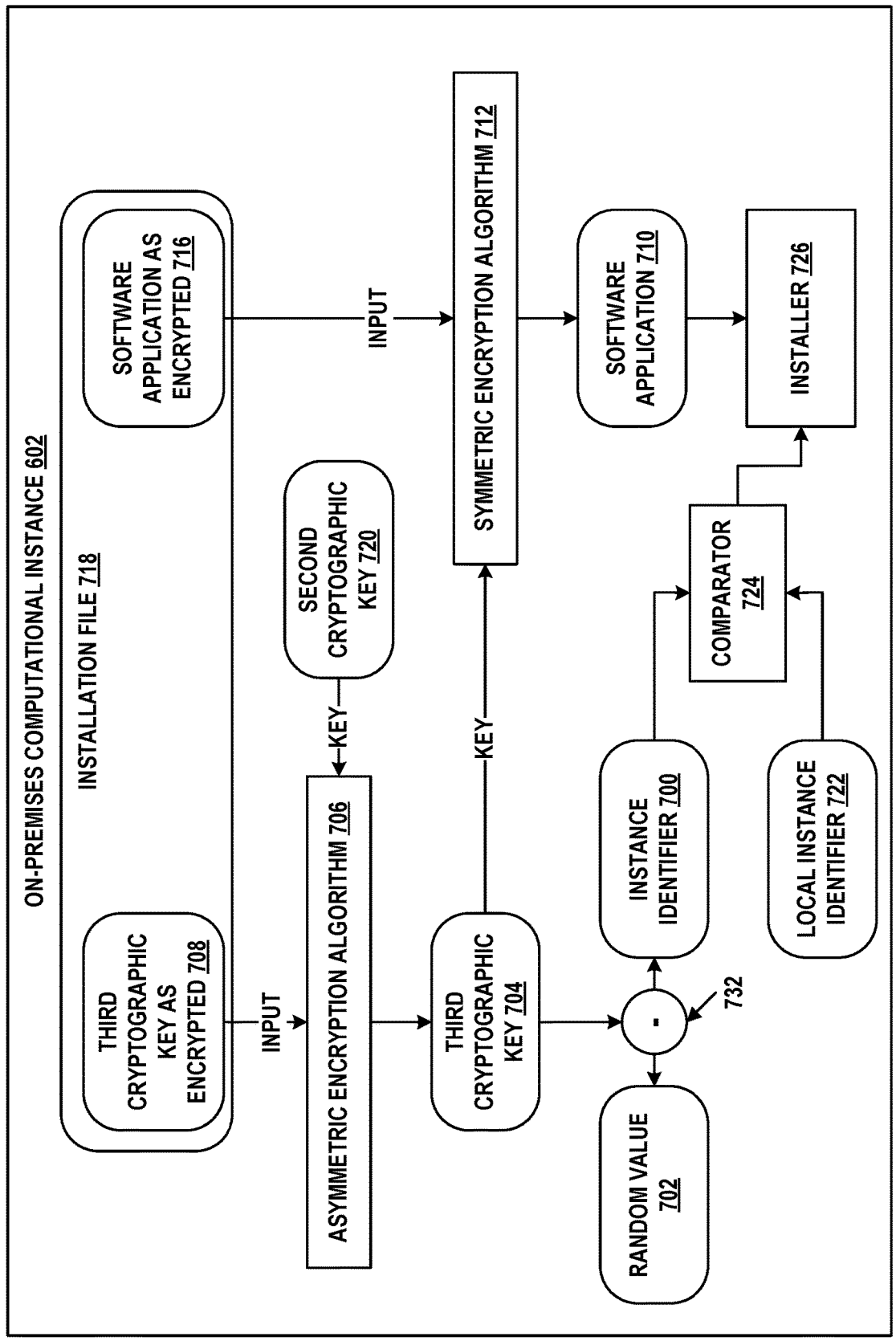

FIGS. 7A and 7B illustrate a first example encryption and decryption architecture for generating the installation file. Specifically, distribution application 600 may include asymmetric encryption algorithm 706, which may be used at block 626 of FIG. 6A, and symmetric encryption algorithm 712, which may be used at block 624. Asymmetric encryption algorithms 706 may include the Rivest-Shamir-Adleman (RSA) algorithm, the ElGamal algorithm, elliptic curve cryptography (ECC) algorithms, and/or the pretty good privacy (PGP) algorithm, among others. Symmetric encryption algorithm 712 may include the data encryption standard (DES) algorithm, the Blowfish algorithm, advanced encryption standard (AES) algorithm, and/or the Rivest Cipher (RC) algorithms (e.g., RC4, RC5, RC6), among others.

Third cryptographic key 704 may be generated based on combination 730 of random value 702 and instance identifier 700 (e.g., as obtained at block 616 of FIG. 6A). In some cases, random value 702 may additionally or alternatively represent a predetermined value. Combination 730 may represent a plurality of possible operations that combine random value 702 and instance identifier 700 in a reversible manner such that instance identifier 700 is recoverable from third-cryptographic key 704 without knowing random value 702, and random value 702 is recoverable from third-cryptographic key 704 without knowing instance identifier 700. For example, combination 730 may represent a concatenation of random value 702 with instance identifier 700. In another example, combination 730 may combine the characters or digits that make up random value 702 and instance identifier 700 according to a predetermined patter (e.g., by alternating the characters of random value 702 with the characters of instance identifier 700). Other combinations are possible.

Third cryptographic key 704 may be used as a key for symmetric encryption algorithm 712 and software application 710 may be used as an input for symmetric encryption algorithm 712 in generating software application as encrypted 716. First cryptographic key 714 (e.g., as obtained at block 610 of FIG. 6A) may be used as a key for asymmetric encryption algorithm 706 and third cryptographic key 704 may be used as an input for asymmetric encryption algorithm 706 in generating third cryptographic key as encrypted 708. Software application as encrypted 716 and third cryptographic key as encrypted 708 may each be stored in installation file 718. Thus, instance identifier 700 may be represented in installation file 718 by third cryptographic key as encrypted 708.

Turning now to FIG. 7B, on-premises computational instance 602 may also include asymmetric encryption algorithm 706 and symmetric encryption algorithm 712. On-premises computational instance 602 may be configured to use asymmetric encryption algorithm 706 and symmetric encryption algorithm 712 to obtain third cryptographic key 704 and software application 710 by decrypting parts of installation file 718. Specifically, in order to recover third cryptographic key 704 from installation file 718, on-premises computational instance 602 may be configured to provide, to asymmetric encryption algorithm 706, third cryptographic key as encrypted 708 as input and second cryptographic key 720 (e.g., as obtained at block 612 of FIG. 6A) as the key. In order to recover software application 710 from installation file 718, on-premises computational instance 602 may be configured to provide, to symmetric encryption algorithm 712, software application as encrypted 716 as input and third cryptographic key 704 as the key.

On-premises computational instance 602 may also be configured to verify whether the representation of instance identifier 700 contained in installation file 718 matches local instance identifier 722, which may be stored by on-premises computational instance 602. Specifically, on-premises computational instance 602 may be configured to decompose third cryptographic key 704 into random value 702 and instance identifier 700, as indicated by decomposition 732. Decomposition 732 may perform the inverse operation of combination 730. Comparator 724 may compare instance identifier 700 to local instance identifier 722. When instance identifier 700 and local instance identifier 722 match, indicating that installation file 718 was intended for on-premises computational instance 602, comparator 724 may be configured to provide a signal enabling installer 726 to install software application 710. When instance identifier 700 and local instance identifier 722 do not match, indicating that installation file 718 was intended for an on-premises computational instance other than on-premises computational instance 602, comparator 724 may be configured to provide a signal disabling installer 726 from install software application 710.

Figure 8B:
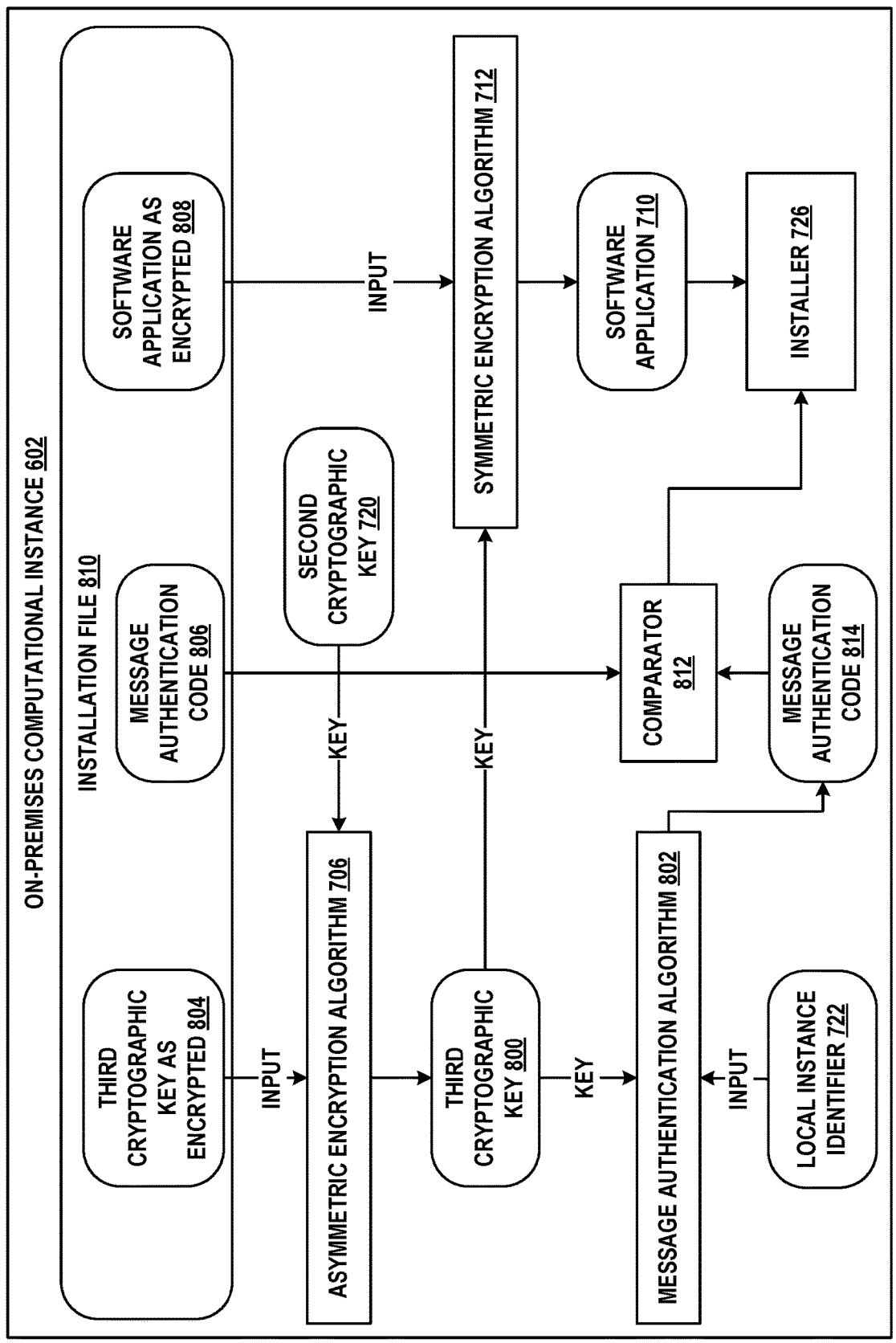

FIGS. 8A and 8B illustrate a second example encryption and decryption architecture for generating the installation file. Specifically, third cryptographic key 800 may be generated based on random value 702, but might not be based on instance identifier 700. Third cryptographic key 800 may be used as a key for symmetric encryption algorithm 712 and software application 710 may be used as an input for symmetric encryption algorithm 712 in generating software application as encrypted 808. First cryptographic key 714 may be used as a key for asymmetric encryption algorithm 706 and third cryptographic key 800 may be used as an input for asymmetric encryption algorithm 706 in generating third cryptographic key as encrypted 804.

Third cryptographic key 800 may be used as a key for message authentication algorithm 802 and instance identifier 700 may be used as an input for message authentication algorithm 802 in generating message authentication code (MAC) 806. Message authentication algorithm 802 may include hash-based message authentication code (HMAC) algorithms, one-key message authentication code (OMAC) algorithms, parallelizable message authentication code (PMAC) algorithms, universal hashing message authentication code (UMAC) algorithms, and/or the Poly1305 algorithm, among others.

In some implementations, third cryptographic key 800 may instead be combined with instance identifier 700 and provided as input to message authentication algorithm 802, thus functioning as a cryptographic salt, and a fourth cryptographic key may be used as a key for message authentication algorithm 802. In other implementations, third cryptographic key 800 might not be used in determining MAC 806, and the fourth cryptographic key may be used as the key. The fourth cryptographic key may be shared by distribution application 600 and on-premises computational instance 602. In some cases, the fourth cryptographic key may be specific to on-premises computational instance 602.

Software application as encrypted 808, third cryptographic key as encrypted 804, and MAC 806 may each be stored in installation file 810. Thus, instance identifier 700 may be represented in installation file 810 by MAC 806.

Turning now to FIG. 8B, on-premises computational instance 602 may be configured to use asymmetric encryption algorithm 706 and symmetric encryption algorithm 712 to obtain third cryptographic key 800 and software application 710 by decrypting parts of installation file 810. Specifically, in order to recover third cryptographic key 800 from installation file 810, on-premises computational instance 602 may be configured to provide, to asymmetric encryption algorithm 706, third cryptographic key as encrypted 804 as input and second cryptographic key 720 as the key. In order to recover software application 710 from installation file 810, on-premises computational instance 602 may be configured to provide, to symmetric encryption algorithm 712, software application as encrypted 808 as input and third cryptographic key 800 as the key.

On-premises computational instance 602 may also be configured to verify whether the representation of instance identifier 700 contained in installation file 810 matches local instance identifier 722. Specifically, on-premises computational instance 602 may be configured to use third cryptographic key 800 as a key for message authentication algorithm 802 and local instance identifier 722 as an input for message authentication algorithm 802 in generating MAC 814. In other implementations, message authentication algorithm 802 may instead be configured to use the fourth cryptographic key, and use third cryptographic key 800 as a cryptographic salt or omit using it altogether. Regardless of the specific arrangement of inputs and keys, on-premises computational instance 602 may use message authentication algorithm 802 in the same way as distribution application 600 so that the MACs generated thereby are comparable.

Thus, if installation file 810 was intended for on-premises computational instance 602 (and has not been modified since its generation by distribution application 600), MAC 806 should match MAC 814. Accordingly, comparator 812 may compare MAC 806 to MAC 814. When MAC 806 and MAC 814 match, indicating that installation file 810 was intended for on-premises computational instance 602, comparator 812 may be configured to provide a signal enabling installer 726 to install software application 710. When MAC 806 and MAC 814 do not match, indicating that installation file 810 was intended for an on-premises computational instance other than on-premises computational instance 602, comparator 812 may be configured to provide a signal disabling installer 726 from install software application 710.

Figure 9A:
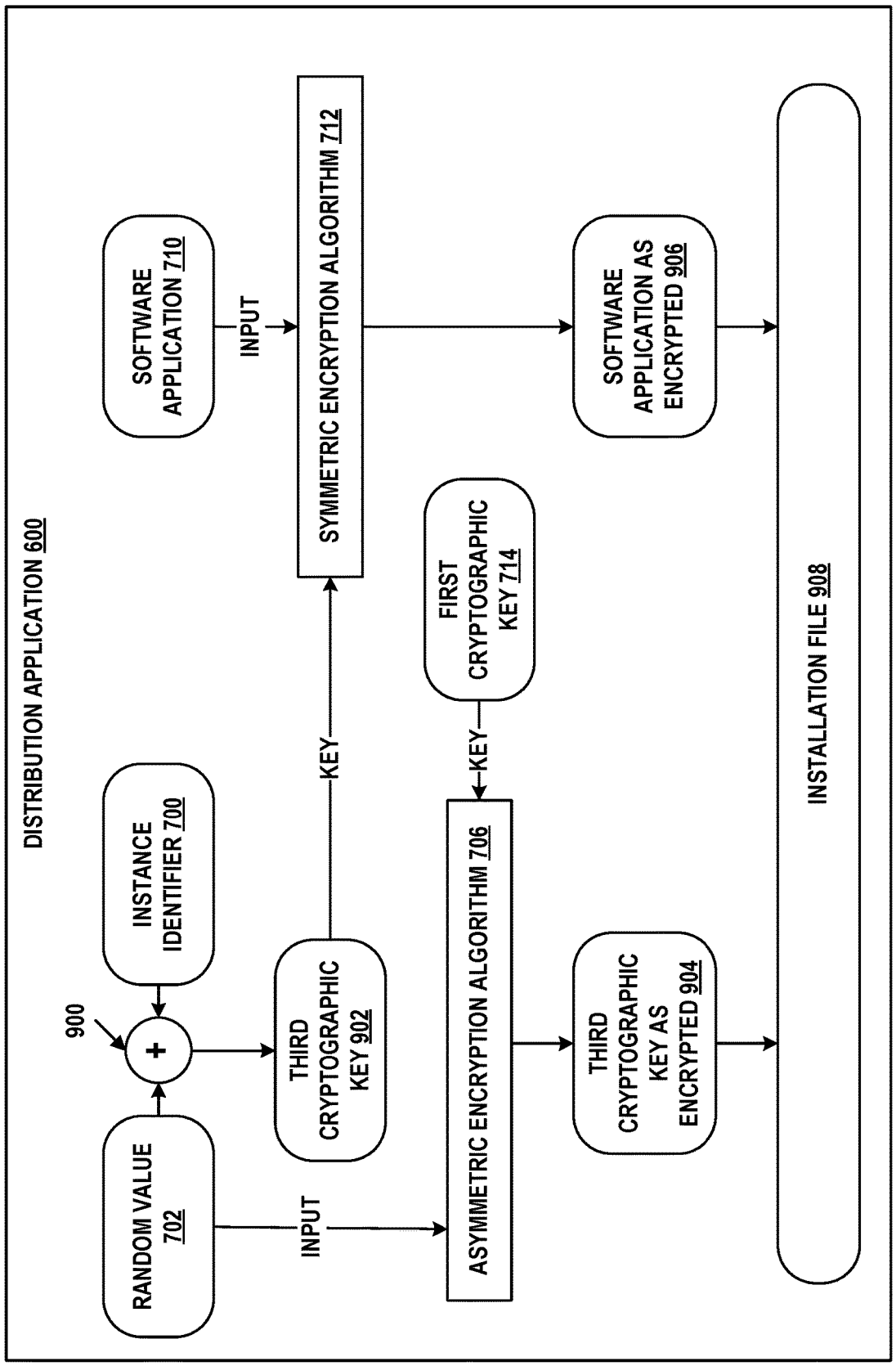
FIGS. 9A and 9B illustrate an encryption architecture, in accordance with example embodiments.
Figure 9B:
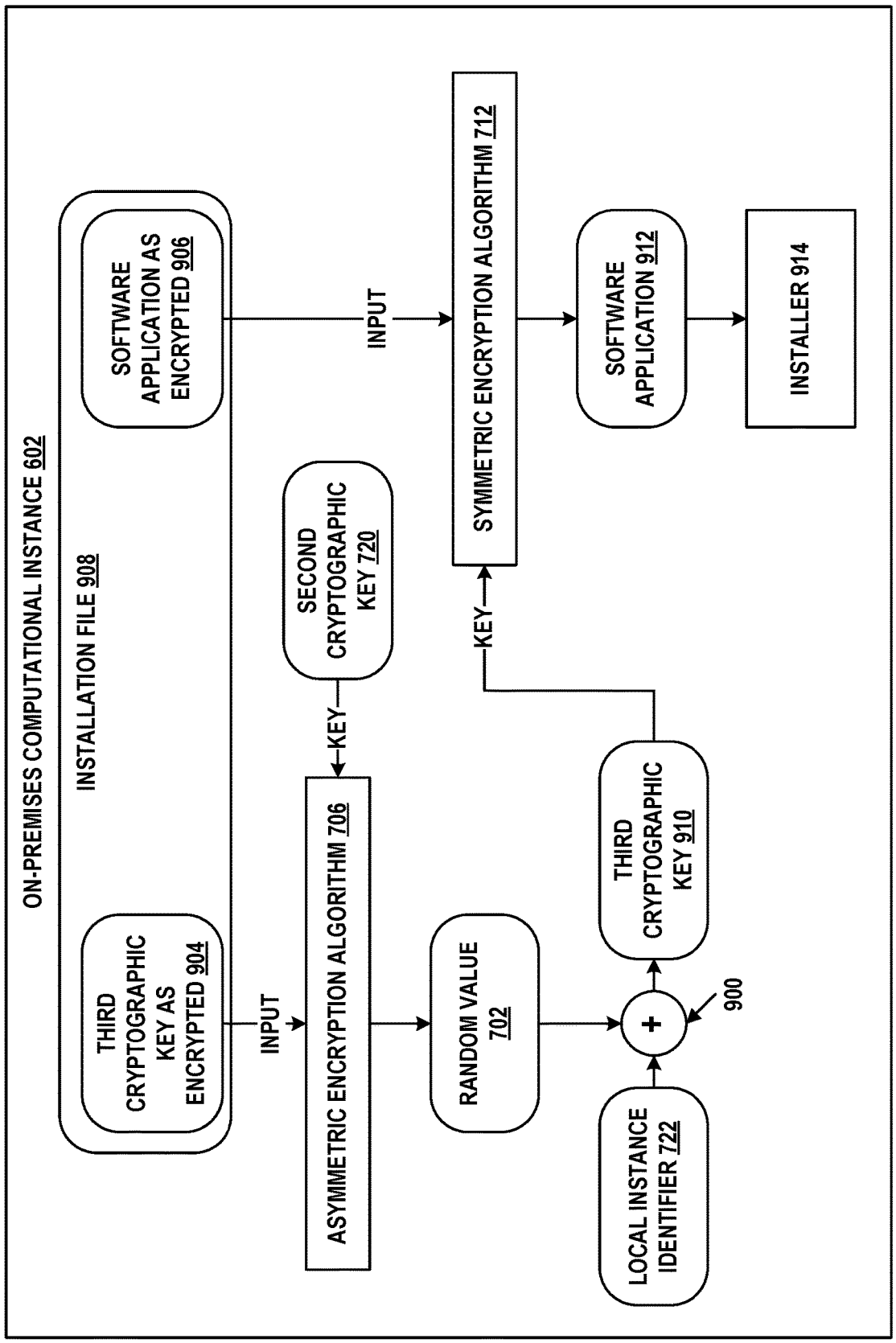

FIGS. 9A and 9B illustrate a third example encryption and decryption architecture for generating the installation file. Specifically, third cryptographic key 902 may be generated based on combination 900 of random value 702 and instance identifier 700. Combination 900 may represent one or more of concatenation, addition, subtraction, division, and/or multiplication, among other operations. Combination 900 might be invertible in that random value 702 might be recoverable based on third cryptographic key 902 if instance identifier 700 is known, and/or instance identifier 700 might be recoverable based on third cryptographic key 902 if random value 702 is known. In some cases, combination 900 might not be invertible.

Third cryptographic key 902 may be used as a key for symmetric encryption algorithm 712 and software application 710 may be used as an input for symmetric encryption algorithm 712 in generating software application as encrypted 906. First cryptographic key 714 may be used as a key for asymmetric encryption algorithm 706 and random value 702 may be used as an input for asymmetric encryption algorithm 706 in generating third cryptographic key as encrypted 904. Thus, third cryptographic key as encrypted 904 may represent a portion of third cryptographic key 902. Software application as encrypted 906 and third cryptographic key as encrypted 904 may each be stored in installation file 908. Thus, instance identifier 700 may be represented in installation file 908 by the dependency of software application as encrypted 906 on instance identifier 700. That is, decryption of software application as encrypted 906 depends on third cryptographic key 902, which in turn depends on instance identifier 700.

Turning now to FIG. 9B, on-premises computational instance 602 may be configured to use asymmetric encryption algorithm 706 and symmetric encryption algorithm 712 to obtain random value 702 (and third cryptographic key 910 based thereon) and software application 912 by decrypting parts of installation file 908. Specifically, in order to generate random value 702 based on installation file 908, on-premises computational instance 602 may be configured to provide, to asymmetric encryption algorithm 706, third cryptographic key as encrypted 904 as input and second cryptographic key 720 as the key. Local instance identifier 722 may then be combined with random value 702 via combination 900 to generate third cryptographic key 910. When local instance identifier 722 matches instance identifier 700, third cryptographic key 910 may be identical to third cryptographic key 902, and thus usable to decrypt software application as encrypted 906.

Thus, in order to generate software application 912 from installation file 908, on-premises computational instance 602 may be configured to provide, to symmetric encryption algorithm 712, software application as encrypted 906 as input and third cryptographic key 910 as the key. When third cryptographic key 910 is identical to third cryptographic key 902, software application 912 may be identical to software application 710, and may thus be installable. When third cryptographic key 910 is different from third cryptographic key 902, software application 912 may differ from software application 710, and thus might not be installable. Namely, when key 910 differs from key 902, decryption using key 910 is likely to produce an output that might not be interpretable, understandable, and/or usable by installer 914.

Accordingly, on-premises computational instance 602 may be configured to verify whether instance identifier 700 matches local instance identifier 722 based on whether third cryptographic key 910 is usable to decrypt software application as encrypted 906. Specifically, when software application 912 represents an installable file (rather than an invalid file), indicating that installation file 908 was intended for on-premises computational instance 602, installer 914 may be able to install software application 912 (i.e., software application 710). When software application 912 represents a file that is not installable (i.e., not interpretable, understandable, and/or usable by installer 914), this indicates that installation file 908 was intended for an on-premises computational instance other than on-premises computational instance 602 or installation file 908 was corrupted in some fashion. In either case, installer 914 may be unable to install software application 912.

VII. Example Operations

Figure 10:
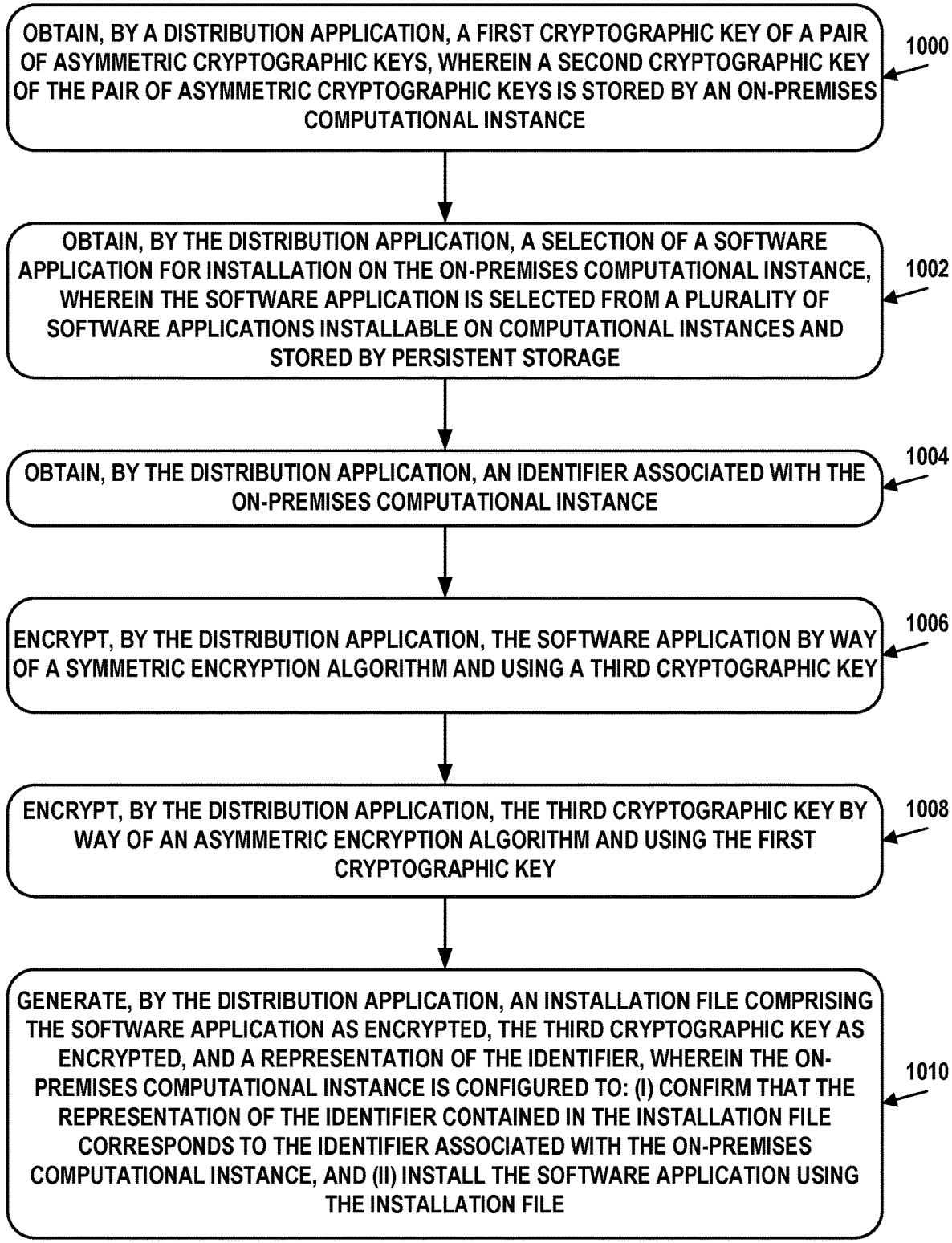
FIG. 10 is a flow chart, in accordance with example embodiments.

FIG. 10 is a flow chart illustrating an example embodiment. The process illustrated by FIG. 10 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 10 may be simplified by the removal of any one or more of the features shown therein. Further, these embodiments may be combined with features, aspects, and/or implementations of any of the previous figures or otherwise described herein.

Block 1000 may include obtaining, by a distribution application, a first cryptographic key of a pair of asymmetric cryptographic keys. A second cryptographic key of the pair of asymmetric cryptographic keys may be stored by an on-premises computational instance.

Block 1002 may include obtaining, by the distribution application, a selection of a software application for installation on the on-premises computational instance. The software application may be selected from a plurality of software applications installable on computational instances and may be stored by persistent storage.

Block 1004 may include obtaining, by the distribution application, an identifier associated with the on-premises computational instance.

Block 1006 may include encrypting, by the distribution application, the software application by way of a symmetric encryption algorithm and using a third cryptographic key.

Block 1008 may include encrypting, by the distribution application, the third cryptographic key by way of an asymmetric encryption algorithm and using the first cryptographic key.

Block 1010 may include generating, by the distribution application, an installation file that includes the software application as encrypted, the third cryptographic key as encrypted, and a representation of the identifier. The on-premises computational instance may be configured to: (i) confirm that the representation of the identifier contained in the installation file corresponds to the identifier associated with the on-premises computational instance, and (ii) install the software application using the installation file.

In some embodiments, the on-premises computational instance may be further configured to (i) decrypt the third cryptographic key as encrypted by way of the asymmetric encryption algorithm and using the second cryptographic key, and (ii) decrypt the software application as encrypted by way of the symmetric encryption algorithm and using the third cryptographic key.

In some embodiments, the on-premises computational instance may be configured to install the software application using the installation file, based on confirming that the representation of the identifier contained in the installation file corresponds to the identifier associated with the on-premises computational instance as stored by the on-premises computational instance.

In some embodiments, a MAC may be generated based on the identifier. The representation of the identifier may include the MAC. Confirming that the representation of the identifier contained in the installation file corresponds to the identifier associated with the on-premises computational instance may include: (i) generating a second MAC based on the identifier, and (ii) confirming that the second MAC matches the MAC.

In some embodiments, the MAC may also be generated based on the third cryptographic key. Generating the second MAC based on the identifier may include generating the second MAC based on the identifier and the third cryptographic key.

In some embodiments, the MAC may also be based on a fourth cryptographic key shared by the distribution application and the on-premises computational instance. Generating the second MAC based on the identifier may include generating the second MAC based on the identifier and the fourth cryptographic key.

In some embodiments, the third cryptographic key may be generated based on a combination of (i) a randomly-generated value and (ii) the identifier. The representation of the identifier may include the identifier stored in the installation file as part of the third cryptographic key as encrypted.

In some embodiments, the third cryptographic key may be generated based on a combination of (i) a randomly-generated value and (ii) the identifier. Encrypting the third cryptographic key may include encrypting the randomly-generated value. The on-premises computational instance may be further configured to (i) decrypt the randomly-generated value as encrypted by way of the asymmetric encryption algorithm and using the second cryptographic key and (ii) generate the third cryptographic key by combining the randomly-generated value with the identifier. The representation of the identifier may include one or more of the software application as encrypted or the third cryptographic key as encrypted.

In some embodiments, the on-premises computational instance may be configured to operate without accessing the distribution application.

In some embodiments, the first cryptographic key may be a public key and the second cryptographic key may be a private key. Obtaining the first cryptographic key may include obtaining a public key certificate associated with the pair of asymmetric cryptographic keys. The installation file may further include a fingerprint identifying the public key certificate. The on-premises computational instance may be configured to select the second cryptographic key for decrypting the third cryptographic key as encrypted based on the fingerprint.

In some embodiments, an expiration time may be determined for the installation file. The installation file may further include an indication of the expiration time. The on-premises computational instance may be configured to permit installation of the software application before the expiration time and reject installation of the software application after the expiration time.

In some embodiments, at least one of (i) the first cryptographic key, (ii) the selection of the software application, or (iii) the identifier may be obtained by way of a user interface provided by the distribution application.

Figure 11:
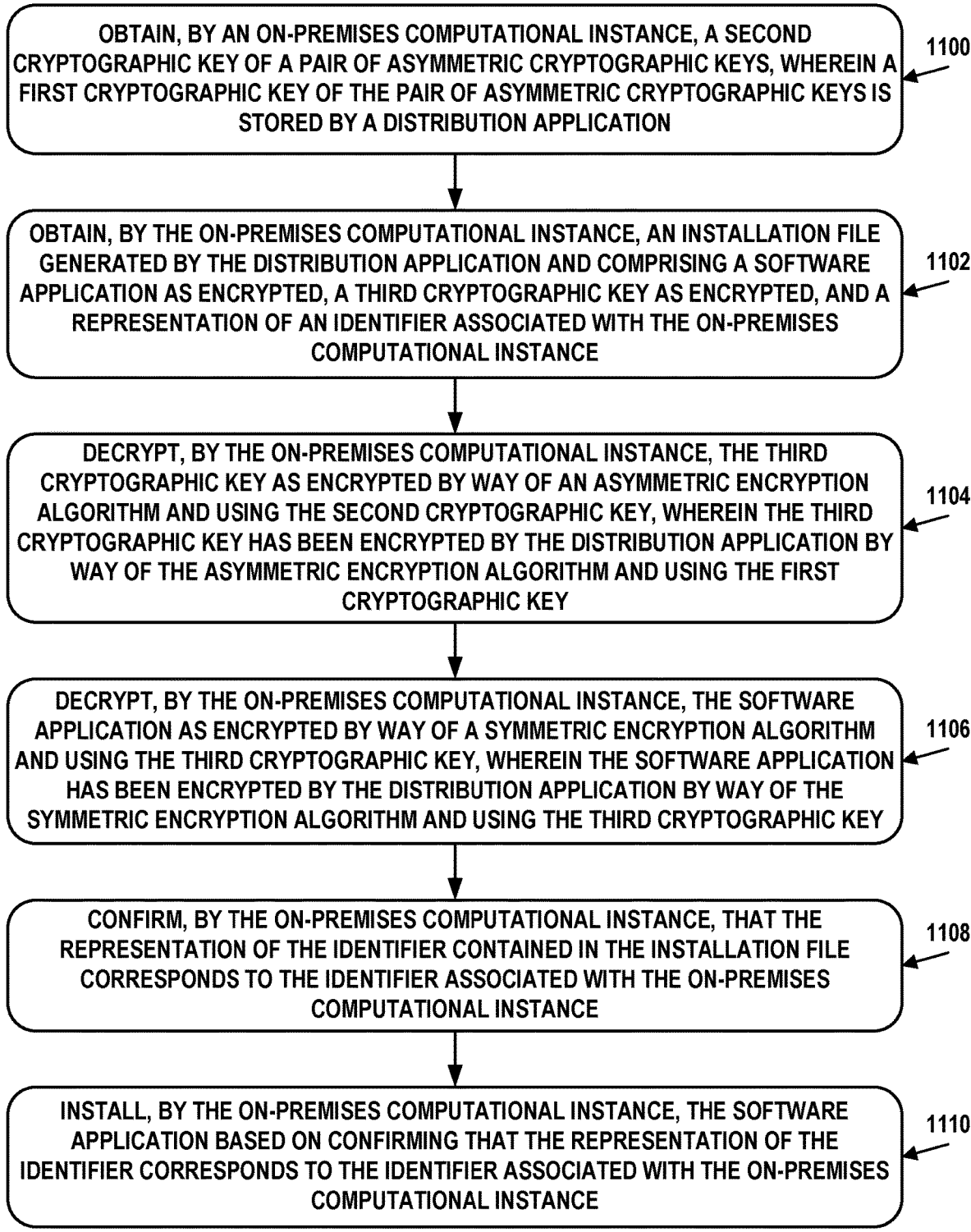
FIG. 11 is a flow chart, in accordance with example embodiments.

FIG. 11 is a flow chart illustrating an example embodiment. The process illustrated by FIG. 11 may be carried out by a computing device, such as computing device 100, and/or a cluster of computing devices, such as server cluster 200. However, the process can be carried out by other types of devices or device subsystems. For example, the process could be carried out by an on-premises computational instance of a managed network or a portable computer, such as a laptop or a tablet device.

The embodiments of FIG. 11 may be simplified by the removal of any one or more of the features shown therein. Further, these embodiments may be combined with features, aspects, and/or implementations of any of the previous figures or otherwise described herein.

Block 1100 may include obtaining, by an on-premises computational instance, a second cryptographic key of a pair of asymmetric cryptographic keys. A first cryptographic key of the pair of asymmetric cryptographic keys may be stored by a distribution application.

Block 1102 may include obtaining, by the on-premises computational instance, an installation file generated by the distribution application. The installation file may include a software application as encrypted, a third cryptographic key as encrypted, and a representation of an identifier associated with the on-premises computational instance.

Block 1104 may include decrypting, by the on-premises computational instance, the third cryptographic key as encrypted by way of an asymmetric encryption algorithm and using the second cryptographic key. The third cryptographic key may have been encrypted by the distribution application by way of the asymmetric encryption algorithm and using the first cryptographic key.

Block 1106 may include decrypting, by the on-premises computational instance, the software application as encrypted by way of a symmetric encryption algorithm and using the third cryptographic key. The software application may have been encrypted by the distribution application by way of the symmetric encryption algorithm and using the third cryptographic key.

Block 1108 may include confirming, by the on-premises computational instance, that the representation of the identifier contained in the installation file corresponds to the identifier associated with the on-premises computational instance.

Block 1110 may include installing, by the on-premises computational instance, the software application based on confirming that the representation of the identifier corresponds to the identifier associated with the on-premises computational instance.

In some embodiments, confirming that the representation of the identifier contained in the installation file corresponds to the identifier associated with the on-premises computational instance may include confirming that the representation of the identifier contained in the installation file corresponds to the identifier associated with the on-premises computational instance as stored by the on-premises computational instance.

In some embodiments, the distribution application may be configured to generate a MAC based on the identifier. The representation of the identifier may include the MAC. Confirming that the representation of the identifier contained in the installation file corresponds to the identifier associated with the on-premises computational instance may include: (i) generating a second MAC based on the identifier, and (ii) confirming that the second MAC matches the MAC.

In some embodiments, the MAC may also be generated based on the third cryptographic key. Generating the second MAC based on the identifier may include generating the second MAC based on the identifier and the third cryptographic key.

In some embodiments, the MAC may also be based on a fourth cryptographic key shared by the distribution application and the on-premises computational instance. Generating the second MAC based on the identifier may include generating the second MAC based on the identifier and the fourth cryptographic key.

In some embodiments, the distribution application may be configured to generate the third cryptographic key based on a combination of (i) a randomly-generated value and (ii) the identifier. The representation of the identifier may include the identifier stored in the installation file as part of the third cryptographic key as encrypted.

In some embodiments, the distribution application may be configured to generate the third cryptographic key based on a combination of (i) a randomly-generated value and (ii) the identifier. The distribution application may be configured to encrypt the third cryptographic key by encrypting the randomly-generated value. Decrypting the third cryptographic key as encrypted may include (i) decrypting the randomly-generated value as encrypted by way of the asymmetric encryption algorithm and using the second cryptographic key and (ii) generating the third cryptographic key by combining the randomly-generated value with the identifier. The representation of the identifier may include one or more of the software application as encrypted or the third cryptographic key as encrypted.

In some embodiments, the on-premises computational instance may be configured to operate without accessing the distribution application.

In some embodiments, the first cryptographic key may be a public key and the second cryptographic key may be a private key. The distribution application may be configured to obtain the first cryptographic key and a public key certificate associated with the pair of asymmetric cryptographic keys. The installation file may further include a fingerprint identifying the public key certificate. The on-premises computational instance may be configured to select the second cryptographic key for decrypting the third cryptographic key as encrypted based on the fingerprint.

In some embodiments, the distribution application may be configured to determine an expiration time for the installation file. The installation file may further include an indication of the expiration time. The on-premises computational instance may be configured to permit installation of the software application before the expiration time and reject installation of the software application after the expiration time.

In some embodiments, the second cryptographic key may be obtained by way of a user interface provided by the on-premises computational instance.

VIII. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system comprising:
 persistent storage configured to store a plurality of software applications installable on computational instances; and
 a distribution application configured to perform operations comprising:
  obtaining a first cryptographic key of a pair of asymmetric cryptographic keys, wherein a second cryptographic key of the pair of asymmetric cryptographic keys is stored by an on-premises computational instance;

obtaining a selection of a software application from the plurality of software applications for installation on the on-premises computational instance;

obtaining an instance identifier of the on-premises computational instance;

generating a third cryptographic key based on the instance identifier;

encrypting the software application by way of a symmetric encryption algorithm and using the third cryptographic key;

encrypting the third cryptographic key by way of an asymmetric encryption algorithm and using the first cryptographic key; and generating an installation file comprising the software application as encrypted and the third cryptographic key as encrypted, wherein reception of the installation file is configured to cause the on-premises computational instance to: (i) determine, based on the third cryptographic key, the instance identifier as contained in the installation file, (ii) determine whether the instance identifier as contained in the installation file matches a local instance identifier stored by the on-premises computational instance, and (iii) install the software application using the installation file based on determining that that the instance identifier as contained in the installation file matches the local instance identifier.

2. The computing system of claim 1, wherein reception of the installation file is further configured to cause the on-premises computational instance to: (i) decrypt the third cryptographic key as encrypted by way of the asymmetric encryption algorithm and using the second cryptographic key, and (ii) decrypt the software application as encrypted by way of the symmetric encryption algorithm and using the third cryptographic key.

3. The computing system of claim 1, wherein reception of the installation file is further configured to cause the on-premises computational instance to: reject installation of the software application using the installation file based on determining that the instance identifier as contained in the installation file does not match the local instance identifier.

4. The computing system of claim 1, wherein the operations further comprise:

generating a message authentication code (MAC) based on the instance identifier, wherein the installation file comprises the MAC, and wherein reception of the installation file is further configured to cause the on-premises computational instance to: (i) generate a second MAC based on the local instance identifier, (ii) determine whether the second MAC matches the MAC, and (iii) install the software application using the installation file further based on determining that that the second MAC matches the MAC.

5. The computing system of claim 4, wherein the MAC is also based on the third cryptographic key, and wherein generating the second MAC comprises generating the second MAC based on the local instance identifier and the third cryptographic key.

6. The computing system of claim 4, wherein the MAC is also based on a fourth cryptographic key shared by the distribution application and the on-premises computational instance, and wherein generating the second MAC comprises generating the second MAC based on the local instance identifier and the fourth cryptographic key.

7. The computing system of claim 1, wherein generating the third cryptographic key comprises:

generating the third cryptographic key based on a combination of (i) a randomly-generated value and (ii) the instance identifier.

8. The computing system of claim 1, wherein generating the third cryptographic key comprises:

generating the third cryptographic key based on a combination of (i) a predetermined value and (ii) the instance identifier.

9. The computing system of claim 1, wherein the on-premises computational instance is configured to operate without accessing the distribution application.

10. The computing system of claim 1, wherein the first cryptographic key is a public key and the second cryptographic key is a private key, and wherein obtaining the first cryptographic key comprises:

obtaining a public key certificate associated with the pair of asymmetric cryptographic keys, wherein the installation file further comprises a fingerprint identifying the public key certificate, and wherein reception of the installation file is further configured to cause the on-premises computational instance to: select, based on the fingerprint, the second cryptographic key for decrypting the third cryptographic key as encrypted.

11. The computing system of claim 1, wherein the operations further comprise:

determining an expiration time for the installation file, wherein the installation file further comprises an indication of the expiration time, and wherein reception of the installation file is further configured to cause the on-premises computational instance to: permit installation of the software application before the expiration time and reject installation of the software application after the expiration time.

12. The computing system of claim 1, wherein at least one of (i) the first cryptographic key, (ii) the selection of the software application, or (iii) the instance identifier is obtained by way of a user interface provided by the distribution application.

13. The computing system of claim 1, wherein the third cryptographic key is based on a reversible combination of the instance identifier and at least one other value, and wherein determining the instance identifier as contained in the installation file comprises reversing the reversible combination to separate the instance identifier from the at least one other value.

14. A method comprising:

obtaining, by a distribution application, a first cryptographic key of a pair of asymmetric cryptographic keys, wherein a second cryptographic key of the pair of asymmetric cryptographic keys is stored by an on-premises computational instance;

obtaining, by the distribution application, a selection of a software application for installation on the on-premises computational instance, wherein the software application is selected from a plurality of software applications installable on computational instances and stored by persistent storage;

obtaining, by the distribution application, an instance identifier of the on-premises computational instance;

generating, by the distribution application, a third cryptographic key based on the instance identifier;

encrypting, by the distribution application, the software application by way of a symmetric encryption algorithm and using the third cryptographic key;

encrypting, by the distribution application, the third cryptographic key by way of an asymmetric encryption algorithm and using the first cryptographic key; and generating, by the distribution application, an installation file comprising the software application as encrypted and the third cryptographic key as encrypted, wherein reception of the installation file is configured to cause the on-premises computational instance to: (i) determine, based on the third cryptographic key, the instance identifier as contained in the installation file, (ii) determine whether the instance identifier as contained in the installation file matches a local instance identifier stored by the on-premises computational instance, and (iii) install the software application using the installation file based on determining that that the instance identifier as contained in the installation file matches the local instance identifier.

15. The method of claim 14, wherein reception of the installation file is further configured to cause the on-premises computational instance to: (i) decrypt the third cryptographic key as encrypted by way of the asymmetric encryption algorithm and using the second cryptographic key, and (ii) decrypt the software application as encrypted by way of the symmetric encryption algorithm and using the third cryptographic key.

16. The method of claim 14, further comprising:

generating a message authentication code (MAC) based on the instance identifier, wherein the installation file comprises the MAC, and wherein reception of the installation file is further configured to cause the on-premises computational instance to: (i) generate a second MAC based on the local instance identifier, (ii) determine whether the second MAC matches the MAC, and (iii) install the software application using the installation file further based on determining that that the second MAC matches the MAC.

17. The method of claim 14, wherein generating the third cryptographic key comprises:

generating the third cryptographic key based on a combination of (i) a randomly-generated value and (ii) the instance identifier.

18. The method of claim 14, wherein generating the third cryptographic key comprises:

generating the third cryptographic key based on a combination of (i) a predetermined value and (ii) the instance identifier.

19. The method of claim 14, wherein the third cryptographic key is based on a reversible combination of the instance identifier and at least one other value, and wherein determining the instance identifier as contained in the installation file comprises reversing the reversible combination to separate the instance identifier from the at least one other value.

20. A non-transitory computer-readable medium having stored thereon program instructions that, upon execution by a computing system, cause the computing system to perform operations comprising:

obtaining a first cryptographic key of a pair of asymmetric cryptographic keys, wherein a second cryptographic key of the pair of asymmetric cryptographic keys is stored by an on-premises computational instance;

obtaining a selection of a software application for installation on the on-premises computational instance, wherein the software application is selected from a plurality of software applications installable on computational instances and stored by persistent storage;

obtaining an instance identifier of the on-premises computational instance;

generating a third cryptographic key based on the instance identifier;

encrypting the software application by way of a symmetric encryption algorithm and using the third cryptographic key;

encrypting the third cryptographic key by way of an asymmetric encryption algorithm and using the first cryptographic key; and generating an installation file comprising the software application as encrypted and the third cryptographic key as encrypted, wherein reception of the installation file is configured to cause the on-premises computational instance to: (i) determine, based on the third cryptographic key, the instance identifier as contained in the installation file, (ii) determine whether the instance identifier as contained in the installation file matches a local instance identifier stored by the on-premises computational instance, and (iii) install the software application using the installation file based on determining that that the instance identifier as contained in the installation file matches the local instance identifier.

* * * * *